United States Patent
Hosaka et al.

(10) Patent No.: US 12,494,044 B2
(45) Date of Patent: Dec. 9, 2025

(54) DATA GENERATION METHOD, LEARNING METHOD, AND ESTIMATION METHOD

(71) Applicant: Sony Semiconductor Solutions Corporation, Kanagawa (JP)

(72) Inventors: Hajime Hosaka, Kanagawa (JP); Yoshikuni Nomura, Tokyo (JP); Yutaka Moriyama, Kanagawa (JP); Ryuhei Hata, Kanagawa (JP); Yoshiki Ando, Kanagawa (JP); Yusuke Shinmi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 415 days.

(21) Appl. No.: 17/802,063

(22) PCT Filed: Mar. 18, 2021

(86) PCT No.: PCT/JP2021/011271
§ 371 (c)(1),
(2) Date: Aug. 24, 2022

(87) PCT Pub. No.: WO2021/193391
PCT Pub. Date: Sep. 30, 2021

(65) Prior Publication Data
US 2023/0147960 A1    May 11, 2023

(30) Foreign Application Priority Data
Mar. 26, 2020 (JP) .................. 2020-056430

(51) Int. Cl.
*G06V 10/774* (2022.01)
*G06T 19/00* (2011.01)
(Continued)

(52) U.S. Cl.
CPC ............ *G06V 10/774* (2022.01); *G06V 10/82* (2022.01); *G06T 19/00* (2013.01); *G06V 10/80* (2022.01)

(58) Field of Classification Search
None
See application file for complete search history.

(56) References Cited

U.S. PATENT DOCUMENTS 10,748,247 B2 *  8/2020  Paluri ............... G06V 10/774
11,366,981 B1 *  6/2022  Paz-Perez ......... G06V 10/778
(Continued)

FOREIGN PATENT DOCUMENTS

CN    108960232 A    12/2018
EP    3432216 A1    1/2019
(Continued)

OTHER PUBLICATIONS

K. Lee and D. Moloney, "Evaluation of synthetic data for deep learning stereo depth algorithms on embedded platforms," 2017 4th International Conference on Systems and Informatics (ICSAI), Hangzhou, China, 2017, pp. 170-176, doi: 10.1109/ICSAI.2017.8248284 (Year: 2017).*

(Continued)

*Primary Examiner* — Utpal D Shah
(74) *Attorney, Agent, or Firm* — Michael Best & Friedrich LLP

(57) ABSTRACT

To generate training data setting various sensor states.
A method for generating data is a method for generating training data used for machine learning from a CG model using a processor. The method for generating data includes: generating, through simulation, a first image acquired under a first imaging condition and a second image acquired under a second imaging condition that is different from the first
(Continued)

imaging condition, in the CG model, and acquiring at least the first image and the second image as input image data in the training data.

20 Claims, 24 Drawing Sheets

(51) Int. Cl.
*G06V 10/80* (2022.01)
*G06V 10/82* (2022.01)

(56) References Cited

U.S. PATENT DOCUMENTS

| | | | |
|---|---|---|---|
| 2019/0197667 A1* | 6/2019 | Paluri | G06V 10/454 |
| 2021/0049776 A1* | 2/2021 | Tan | G06F 18/24323 |
| 2021/0103745 A1* | 4/2021 | Chakravarty | G06V 20/584 |
| 2023/0023164 A1* | 1/2023 | Parameswaran | G06V 10/7753 |
| 2024/0135672 A1* | 4/2024 | Li | G06T 15/08 |

FOREIGN PATENT DOCUMENTS

| | | |
|---|---|---|
| JP | H06348840 A | 12/1994 |
| JP | 2004272358 A | 9/2004 |
| JP | 2006268825 A | 10/2006 |
| JP | 2011501875 A | 1/2011 |
| JP | 2019023858 A | 2/2019 |
| JP | 2019124986 A | 7/2019 |
| WO | 2019111501 A1 | 6/2019 |

OTHER PUBLICATIONS

Kar, A., Häne, C., & Malik, J. (2017). Learning a multi-view stereo machine. Advances in neural information processing systems, 30 (Year: 2017).*

N. Sun, H. Mansour and R. Ward, "HDR image construction from multi-exposed stereo LDR images," 2010 IEEE International Conference on Image Processing, Hong Kong, China, 2010, pp. 2973-2976, doi: 10.1109/ICIP.2010.5653371 (Year: 2010).*

B. Planche et al., "DepthSynth: Real-Time Realistic Synthetic Data Generation from CAD Models for 2.5D Recognition," 2017 International Conference on 3D Vision (3DV), Qingdao, China, 2017, pp. 1-10, doi: 10.1109/3DV.2017.00011 (Year: 2017).*

Riegler, G., Ferstl, D., Rüther, M., & Bischof, H. (2016). A deep primal-dual network for guided depth super-resolution. arXiv preprint arXiv:1607.08569 (Year: 2016).*

C. Won, J. Ryu, and J. Lim, "OmniMVS: End-to-end learning for omnidirectional stereo matching," 2019 IEEE/CVF International Conference on Computer Vision (ICCV), Oct. 2019. doi:10.1109/iccv.2019.00908 (Year: 2019).*

Zioulis, N., Karakottas, A., Zarpalas, D., & Daras, P. (2018). Omnidepth: Dense depth estimation for indoors spherical panoramas. In Proceedings of the European Conference on Computer Vision (ECCV) (pp. 448-465) (Year: 2018).*

Sitzmann, V., Zollhöfer, M., & Wetzstein, G. (2019). Scene representation networks: Continuous 3d-structure-aware neural scene representations. Advances in Neural Information Processing Systems, 32 (Year: 2019).*

Howe, C. L., Webb, K. F., Abayzeed, S. A., Anderson, D. J., Denning, C., & Russell, N. A. (2019). Surface plasmon resonance imaging of excitable cells. Journal of physics D: Applied physics, 52(10), 104001 (Year: 2019).*

Nikolenko, S. I. (2019). Synthetic Data for Deep Learning. arXiv preprint arXiv: 1909.11512. (Year: 2019).*

M. J. Landau, B. Y. Choo and P. A. Beling, "Simulating Kinect Infrared and Depth Images," in IEEE Transactions on Cybernetics, vol. 46, No. 12, pp. 3018-3031, Dec. 2016, doi: 10.1109/TCYB.2015.2494877 (Year: 2016).*

Cabon, Y., Murray, N., & Humenberger, M. (2020). Virtual kitti 2. arXiv preprint arXiv:2001.10773. (Year: 2020).*

Mayer, N., Ilg, E., Häusser, P., Fischer, P., Cremers, D., Dosovitskiy, A., & Brox, T. (2015). A Large Dataset to Train Convolutional Networks for Disparity, Optical Flow, and Scene Flow Estimation. arXiv preprint arXiv:1512.02134 (Year: 2015).*

J. Flynn, I. Neulander, J. Philbin and N. Snavely, "Deep Stereo: Learning to Predict New Views from the World's Imagery," 2016 IEEE Conference on Computer Vision and Pattern Recognition (CVPR), Las Vegas, NV, USA, 2016, pp. 5515-5524, doi: 10.1109/CVPR.2016.595. (Year: 2016).*

International Search Report (PCT/ISA/210), International Application No. PCT/JP2021/011271, dated Jun. 1, 2021.

* cited by examiner

DATA GENERATION METHOD, LEARNING METHOD, AND ESTIMATION METHOD

TECHNICAL FIELD

The present disclosure relates to a data generation method, a learning method, and an estimation method.

BACKGROUND ART

Recently, generation of estimation model based on machine learning and the like including deep learning has been widely studied. In a case in which machine learning is executed, it is necessary to input a large amount of training data to a model to be generated. Also, a large amount of training data is needed in order to execute validation as well. In order to collect training data to be used to generate a model using images as inputs, it is necessary to acquire actual landscapes as photographs and to draw pictures. After such training data is collected, it is necessary for persons who execute training to apply annotations to the individual pieces of training data in many cases.

The collection of data requires time and effort, and there may be cases where it is difficult to train a model from which a desirable estimation result can be obtained when the collected data is used. In a case in which an image captured from a center position of a stereo camera is estimated from a stereo image captured by the camera, an image captured from the center position is needed as teaching data, but it may be physically difficult to acquire the image due to problems such as the size of the camera.

Also, it is not actually possible to capture the same landscape with cameras oriented in the same direction at the same clock time using a plurality of sensors of the same type or different types. In a case in which a distance to a target is acquired from an image of a camera that acquires an RGB image, for example, it is possible to perform imaging by aligning a camera that acquires a TOF image next to the camera and to generate a model for estimating the distance to the target using the distance obtained from the TOF image as teaching data. However, it is difficult to accurately acquire, from the TOF image, the distance from the plane of the sensor that has acquired the RGB image regardless of how the estimation model is trained, and the model trained in this manner thus often includes an error that is not sufficiently small.

CITATION LIST

Patent Literature

[PTL 1]
  JP H6-348840 A

SUMMARY

Technical Problem

Thus, the present disclosure realizes generation of training data from arbitrary imaging in various sensor states.

Solution to Problem

According to an embodiment, a method for generating data is a method for generating training data used for machine learning from a CG model using a processor, the method including: generating, through simulation, a first image acquired under a first imaging condition and a second image acquired under a second imaging condition that is different from the first imaging condition, in the CG model; and acquiring at least the first image and the second image as input image data in the training data.

An imaging position included in the first imaging condition may be a position that is different from an imaging position included in the second imaging condition.

The method may further include: generating, through simulation, a third image that is acquired under a third imaging condition including a condition that imaging is performed from the same position as the position of any one of the first imaging condition and the second imaging condition or from a position that is different from both of the positions in the first imaging condition and the second imaging condition, within the CG model; and acquiring at least the third image as output image data in the training data.

As imaging conditions, the first imaging condition and the second imaging condition may further include optical systems with different image angles.

As imaging conditions, the third images captured at a plurality of changed image angles in the third imaging condition may be further acquired.

As imaging conditions, the first imaging condition and the second imaging condition may further include optical systems with different dynamic ranges.

The first imaging condition may be that a pixel value is less likely to be saturated than that of the second imaging condition, and the second imaging condition may be that noise is smaller than that of the first imaging condition.

The first imaging condition may be that a sensor acquires sensing information by performing logarithmic transformation, and the second imaging condition may be that a sensor acquires sensing information without performing logarithmic transformation.

The first imaging condition and the second imaging condition may have different exposure times.

The first imaging condition and the second imaging condition may have different charge accumulation times in sensors.

The third image may be an image with a high dynamic range.

As the imaging conditions, the first imaging condition and the second imaging condition may further include conditions that information to be sensed by sensors are different.

The first imaging condition may be imaging of acquiring color information, and the second imaging condition may be imaging of acquiring temperature information.

The second imaging condition is imaging performed by a sensor that senses infrared rays.

The first imaging condition may be imaging of acquiring grayscale information, and the second imaging condition is imaging of acquiring color information.

The first imaging condition may be imaging of acquiring grayscale information, and the second imaging condition may be imaging of acquiring information using plasmon resonance.

A pixel size of the sensor in the first imaging condition and a pixel size of the sensor in the second imaging condition may be different sizes.

The first imaging condition may be imaging of acquiring color information, and the second imaging condition may be imaging of acquiring distance information.

The third imaging condition may be imaging of acquiring distance information at the same position and in the same direction as those of the first imaging conditions.

The second imaging condition and the third imaging condition may be imaging of acquiring TOF images.

The first imaging condition and the second imaging condition may be imaging achieved by imaging systems orientated in opposite directions and having optical systems that include super-wide-angle lenses and do not mechanically interfere with each other.

A fourth image acquired under a fourth imaging condition that is imaging of an optical system orientated in a direction different from that of the third imaging condition and having the same principal point as that of the optical system of the third imaging condition may be generated through simulation, and the fourth image may be acquired as output data of the training data.

The second imaging condition may be imaging in a direction of an optical axis that randomly deviates from a predetermined direction parallel to an optical axis of the first imaging condition from a position that randomly deviates from a relative predetermined position with respect to the first imaging condition.

The deviation of the position of the second imaging condition from the predetermined position and the deviation of the direction of the optical axis of the second imaging condition from the predetermined direction may be acquired as teaching data of the training data.

The method may further include: setting a first predetermined position, a second predetermined position, a first optical axis direction, and a second optical axis direction, the first imaging condition being imaging in a direction that randomly deviates from the first optical direction from a position that randomly deviates from the first predetermined position, the second imaging condition being imaging in a direction that randomly deviates from the second optical axis direction from a position that randomly deviates from the second predetermined position.

The method may further include: generating, through simulation, a third image acquired under a third imaging condition of imaging the first optical axis direction from the first predetermined position; generating, through simulation, a fourth image acquired under a fourth imaging condition of imaging the second optical axis direction from the second predetermined position, and aquiring the third image and the fourth image as teaching data of the training data.

The imaging conditions may include a condition of generating a set of input image data in three or more pieces of the training data.

The imaging conditions may include a condition of generating a set of output image data in two or more pieces of the training data.

According to an embodiment, there is provided a learning method of executing optimization of an estimation model using training data generated by the aforementioned method for generating data.

The estimation model may be a neural network model.

According to an embodiment, there is provided an estimation method of acquiring estimation data for input data that is actual shooting data using an estimation model optimized using training data generated by the method for generating data.

The estimation model may be a neural network model.

According to an embodiment, there is provided a data generation device including: a memory; a processor, in which the processor executes the aforementioned method for generating data.

According to an embodiment, there is provided a learning device including: a memory; and a processor, in which the processor executes the aforementioned learning method.

According to an embodiment, there is provided an estimation device including: a memory; and a processor, in which the processor executes the aforementioned estimation method.

According to an embodiment, there is provided a program that causes a processor to execute the aforementioned data generation method, the learning method, or the estimation method.

According to an embodiment, there is provided a non-transitory computer readable medium storing a program for executing any one of the above methods.

According to an embodiment, a method for generating a learning model is a method for generating a learning model using training data generated from a CG model using a processor and used for machine learning, the method including:

generating, through simulation, a first image acquired under a first imaging condition and a second image acquired under a second imaging condition that is different from the first imaging condition, in the CG model, at least the first image and the second image being acquired as input image data in the training data.

In the method for generating a learning model, the acquisition of the input image data may be generated by any one of the aforementioned methods for generating data.

According to an embodiment, there is provided a method for generating a storage medium including: storing, in a storage medium, a learning model generated by the aforementioned method for generating a learning model.

According to an embodiment, there is provided a method for generating an electronic device including: storing, in a storage medium of an electronic device, a learning model generated by the aforementioned method for generating a learning model.

DESCRIPTION OF EMBODIMENTS

Hereinafter, embodiments of the present disclosure will be described using the drawings. In the present disclosure, images captured in various states are generated and acquired through simulation using CG models and used as training data for machine learning. The images captured in various states are images in various directions or situations captured by a plurality of cameras with the same performance or different performances, for example.

Figure 1:
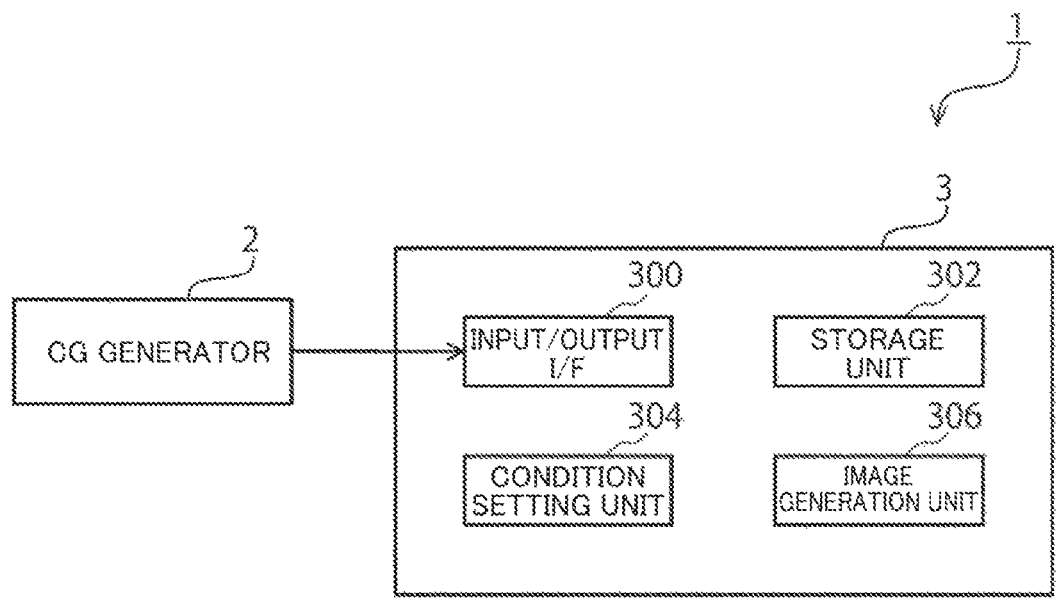
FIG. 1 is a diagram illustrating an example of a data generation system according to an embodiment.

FIG. 1 is a diagram illustrating an example of a data generation system according to an embodiment. Although a data generation system 1 is configured of separate devices, the data generation system 1 may be configured as a data generation device having functions that cover all of these. The data generation system 1 includes a CG generator 2 and a simulator 3.

The CG generator 2 is a device that generates CG models. The CG generator 2 disposes one or more objects in a landscape CG model, for example. The CG generation may be realized in response to an instruction from a user.

The simulator 3 includes an input/output interface (hereinafter, described as an input/output I/F 300), a storage unit 302, a condition setting unit 304, and an image generation unit 306. The simulator 3 executes simulation using the CG model generated by the CG generator 2 and generates training data for machine learning. The simulator 3 generates images under various imaging conditions by executing simulation in consideration of conditions of light beams, the position of a cameras and conditions of an optical system, and a sensor system in the CG model. The simulator 3 generates images by executing rendering such as ray tracing, for example.

The input/output I/F 300 executes transmission and reception of data between the simulator 3 and the outside. For example, the input/output I/F 300 receives the CG model generated by the CG generator 2 as an input and stores the CG model in the storage unit 302. Also, the input/output I/F 300 outputs images generated by the simulator 3 to the outside. Moreover, the input/output I/F 300 may receive a request from a user.

The storage unit 302 stores data that is necessary at least for the simulator 3. For example, data and the like input via the input/output I/F 300 may be stored. For example, information set by the condition setting unit 304 may be stored. Also, images generated by the image generation unit 306 may be stored, for example.

The condition setting unit 304 sets imaging conditions inside the CG model. The imaging conditions are conditions of the camera that acquires images in the CG model or conditions of the outside such as a light source. The conditions of the camera include, for example, conditions of a lens system of the camera and conditions of a sensor that receives light via the lens system. The conditions of the light source are conditions determining, for example, a type of the light source, a direction of the light source, and the like.

The image generation unit 306 generates, through simulation, images acquired in the CG model on the basis of the conditions set by the condition setting unit 304. The simulation is executed by numerical calculation. The generation is executed using a rendering method such as ray tracing. The image generation unit 306 performs irradiation with light from the light source set by the condition setting unit 304 and generates a rendered model for information of an environment and objects in the CG model, for example. The rendered model is simulated for what images can be acquired on the basis of the imaging condition in regard to the camera to acquire images of the CG model for the imaging condition.

The condition setting unit 304 can also set a plurality of imaging conditions, and in this case, the image generation unit 306 generates images that can be acquired under the plurality of conditions for the same CG model. In a case in which the condition setting unit 304 sets three imaging conditions, namely a first imaging condition, a second imaging condition, and a third imaging condition, for example, the image generation unit 306 simulates and generates a first image, a second image, and a third image on the basis of the first imaging condition, the second imaging condition, and the third imaging condition, respectively. The first image, the second image, and the third image are output as training data from the data generation system 1. Note that although the number of imaging conditions are three in the above description, the number is not limited thereto and may be two or may be four or more.

Figure 2:
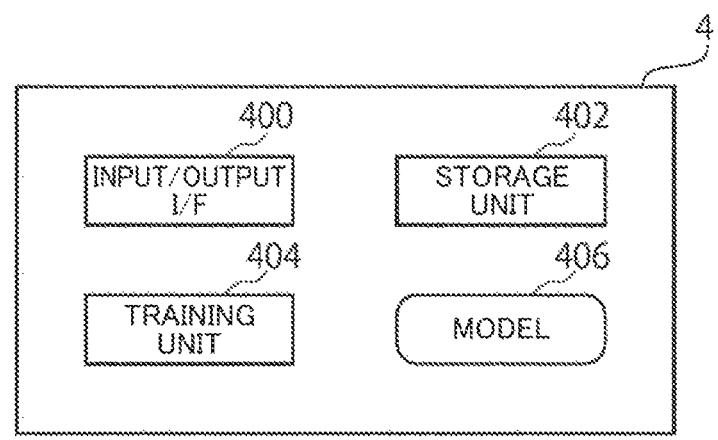
FIG. 2 is a diagram illustrating an example of a training device according to an embodiment.

FIG. 2 is a diagram illustrating an example of a training device (learning device) that executes machine learning according to an embodiment. A training device 4 includes an input/output I/F 400, a storage unit 402, and a training unit 404 and further includes a model 406 that is a target of training. The training device 4 executes training of the model 406 that estimates certain results from images using training data output by the data generation system 1, for example.

The input/output I/F 400 executes input and output of data and the like between the training device 4 and the outside.

The storage unit 402 stores data that is necessary at least for the training device 4. For example, training data and the like input via the input/output I/F 400 may be stored. For example, data required by the training unit 404 to execute training may be stored. Also, at least one of a hyper parameter configuring the model 406, a parameter in the process of optimization, and an optimized parameter may be stored, for example.

The training unit 404 trains the model 406 using a method of machine learning using the training data input via the input/output I/F 400. The machine learning may be executed by a generally known method. The model for which optimization has been ended through training may be output via the input/output I/F 400 or may be stored in the storage unit 402.

The model 406 is a model adapted such that once some data is input thereto, the model 406 estimates and outputs different data regarding the data. The model 406 may be a neural network model. Also, the model 406 may be a model based on various statistical models. Once optimization is performed, the model 406 is output as a learned model.

The training device 4 executes optimization of the model 406 on the basis of a plurality of sets of training data output from the data generation system 1. The data generation system 1 generates sets of training data required for optimization in the training device 4. The training data may be further converted into a large number of pieces of data by an augmentation method, or the data generation system 1 may set various imaging conditions restricted by conditions necessary to optimize an estimation model and then execute acquisition of data a plurality of times.

Figure 3:
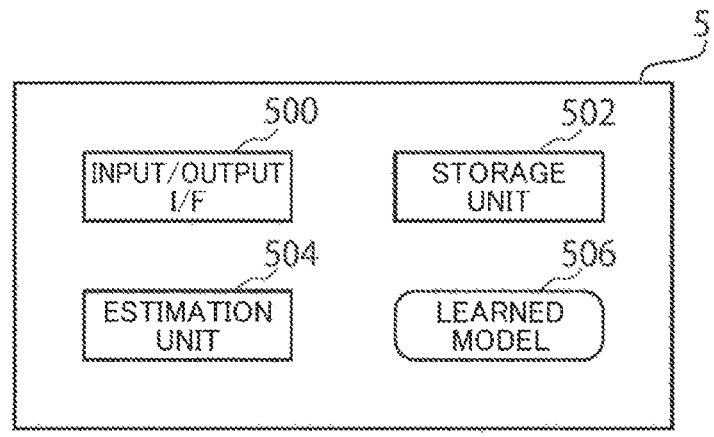
FIG. 3 is a diagram illustrating an example of an estimation device according to an embodiment.

FIG. 3 is a diagram illustrating an example of an estimation device that executes estimation according to an embodiment. The estimation device 5 includes an input/output I/F 500, a storage unit 502, and an estimation unit 504 and further includes a learned model 506 used for estimation. The estimation device 5 outputs an estimation result by inputting data to the learned model 506.

The input/output I/F 500 executes input and output of data and the like between the estimation device 5 and the outside.

The storage unit 502 stores data that is necessary at least for the estimation device 5. For example, data and the like input via the input/output I/F 500 may be stored. For example, the estimation unit 504 may store data that is necessary to execute estimation. Also, at least one of a hyper parameter configuring the learned model 506 and an optimized parameter may be stored.

The estimation unit 504 acquires estimation data by using the learned model 506 from data input via the input/output I/F 500 and outputs the estimation data via the input/output I/F 500 or stores the estimation data in the storage unit 502.

The learned model 506 is a model optimized by the training device 4 with training data generated by the data generation system 1. Once appropriate data is input, the learned model 506 outputs data on which predetermined estimation has been executed.

Note that components of the training device 4 and the estimation device 5 may be included in the same device. In other words, the training device 4 and the estimation device 5 may be configured as a single device. With this configuration, it is possible to realize estimation while realizing retraining of the learned model 506 on which optimization has been ended once.

In this manner, the estimation model can be optimized by the training device 4 using the training data generated by the data generation system 1, and the estimation device 5 can be formed using the estimation model.

Figure 4:
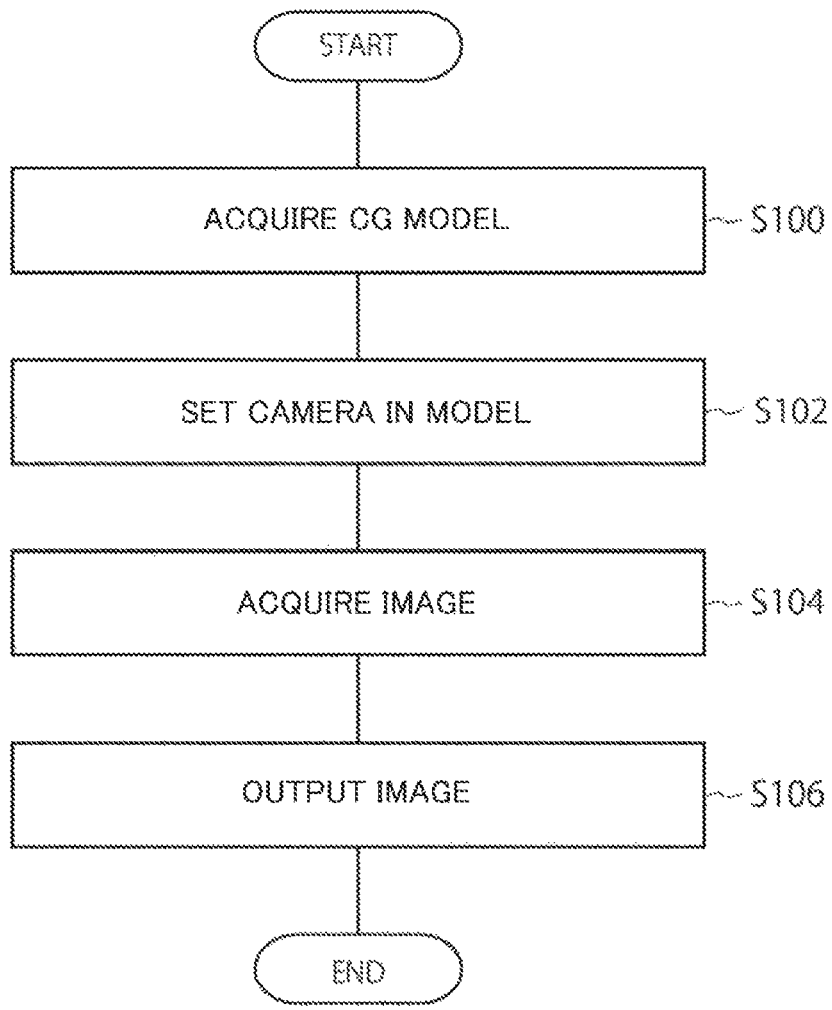
FIG. 4 is a flowchart illustrating processing of the data generation system according to an embodiment.

FIG. 4 is a flowchart illustrating an example of processing performed by the data generation system 1.

First, the data generation system 1 acquires a CG model by a CG generator 2 (S100). The CG model is not limited to a CG model generated by the CG generator 2, and a CG model generated in advance may be used. In this case, the CG generator 2 is not an essential configuration in the data generation system 1.

Next, a camera on a simulator is set on the basis of an imaging condition in the CG model (S102). In addition to the setting of the camera, information regarding a light source and the like based on the imaging condition may be set. As the setting of the camera, an optical system such as a lens and a light receiving system such as a sensor based on the imaging condition are mounted on the basis of the position of the camera set by the imaging condition, for example.

Next, the simulator 3 simulates a state obtained by imaging the inside of the CG model on the basis of the imaging condition and acquires an image in accordance with the imaging condition (S104). The simulator 3 performs rendering on the basis of the camera set in the CG model in S102 described above and generates an image acquired by the camera.

Next, the image generated by the simulator 3 is output (S106). The output image is input to the training device 4, for example, and optimization of the estimation model is executed by a method based on machine learning.

In a case in which there are a plurality of imaging conditions, the plurality of imaging conditions may be set in S102, a plurality of images may be acquired in S104, and the plurality of images may be output in S106. In another example, S102 to S106 may be repeated for each of the plurality of imaging conditions. In a case in which three imaging conditions are set, for example, three kinds of images may be acquired by repeating the processing in S102 to S106 three times while changing the imaging conditions.

In the present disclosure, a method for generating training data used for machine learning from a CG model in this manner will be described. The method is realized by a processor of a computer, for example.

Specifically, images that are to be acquired under the plurality of imaging conditions are generated by the simulator 3 in the CG model, and the data generation system 1 acquires at least one of these generated images as training data.

Hereinafter, some embodiments that are non-limiting examples of the present disclosure will be described in regard to imaging conditions and estimation for the imaging conditions.

First Embodiment

In a first embodiment, at least two images captured from different positions in a CG model and at least one image captured from the same position as that of one of the two images or a position different from both of them are acquired.

Figure 5A:
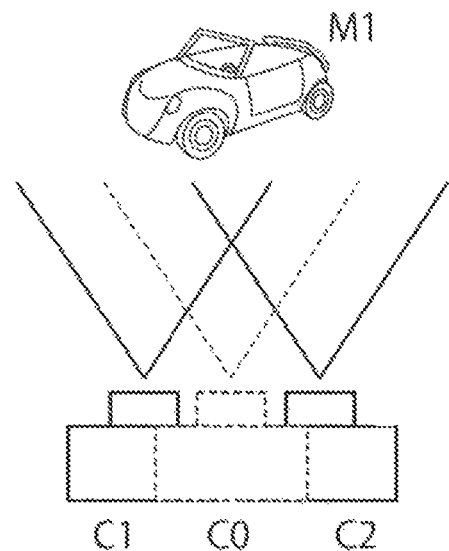
FIG. 5A is a diagram illustrating an example of camera disposition in a CG model according to an embodiment.

FIG. 5A is a diagram illustrating, as an example, cameras on a simulation for an imaging condition in accordance with the present embodiment. These cameras are disposed in the CG model and image an environment and/or objects in the CG model. The imaging is not limited to a stationary image and may be a video image. Although an object M1 is assumed to be imaged in an example in the following description, this is not limited to an object and may be a landscape or the like. Also, there is no limitation to imaging of an object that can be seen by a person without a tool, and images may be acquired by a microscope, an endoscope, or a telescope, for example.

Each camera images an object M1 inside the CG model.

Although three cameras, for example, cameras C0, C1, and C2 are used, the number of cameras is not limited thereto and may be larger. An imaging condition corresponds to each camera. The imaging condition includes the positions of the cameras as illustrated in the drawing and may further include information regarding a state of a light source in the CG model (light irradiation state) and a lens and a sensor of each camera.

The camera C0 is a camera for acquiring an ideal image and is a camera that acquires an image corresponding to an output image of a model that is a training target in machine learning. The cameras C1 and C2 are cameras for acquiring images to be input to the model. In the CG model, it is possible to perform imaging at the same time using the cameras C1 and C2 with the camera C0 disposed to overlap these cameras as illustrated in FIG. 5A.

The aforementioned simulator 3 generates an image captured by each camera through simulation after each camera is mounted in the CG model. The data generation system 1 outputs the generated images as a set of training data.

Note that although the diagram of the cameras is illustrated, the cameras are not limited to cameras with separate casings, and a plurality of imaging systems (lenses, sensors, and the like) included in a single casing, for example, such as a mobile terminal may be used. In this case, since the positions between the lenses are fixed, for example, it is possible to dispose two or more cameras in the CG model using the fixed positions as relative positions.

Figure 5B:
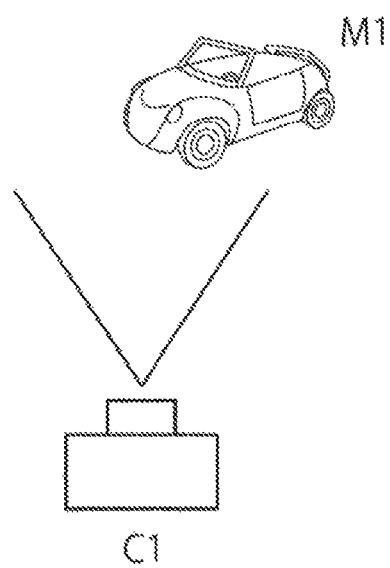
FIG. 5B is a diagram illustrating an example of camera disposition in a CG model according to an embodiment.
Figure 5C:
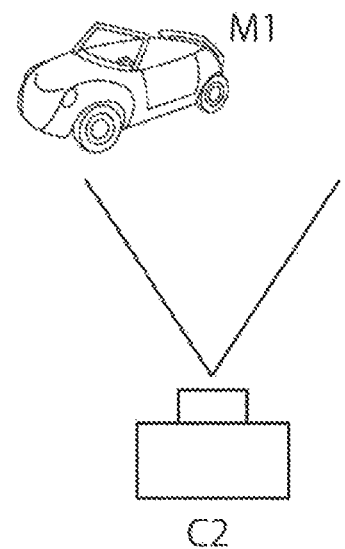
FIG. 5C is a diagram illustrating an example of camera disposition in a CG model according to an embodiment.
Figure 5D:
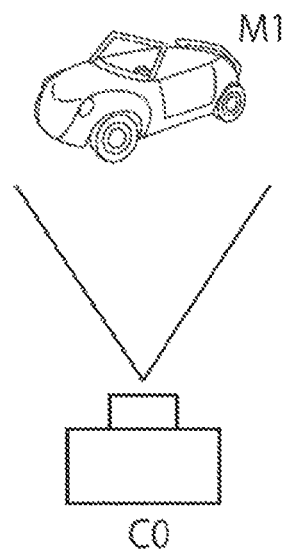
FIG. 5D is a diagram illustrating an example of camera disposition in a CG model according to an embodiment.

FIGS. 5B to 5D are diagrams illustrating a state of imaging of the object M1 of each camera. As illustrated in FIGS. 5B to 5D, each camera images the inside of the CG model at the same time from a different position. For example, the cameras C0, C1, and C2 are models that perform imaging with lenses having the same image angle. (HDR Synthesis)

For example, it is possible to generate training data used to optimize an estimation model that performs high dynamic range synthesis (HDR synthesis) with such disposition. Examples of imaging conditions for performing HDR synthesis will be described.

An imaging condition that the camera C1 is a camera that is less likely to cause saturation of a pixel value but is likely to cause noise (large noise) is set as an imaging condition. An imaging condition that the camera C2 is a camera that is likely to cause saturation of a pixel value but is less likely to cause noise (small noise) is set. Imaging conditions may be set in which the camera C0 is a camera that is less likely to cause saturation of a pixel value and is more likely to have less noise. Moreover, the camera C0 may be a camera capable of appropriately acquiring a pixel value for each region in the CG model and executing gamma correction and the like.

In the above case, the camera C1 may include a circuit that accumulates photoelectrons that exceed an allowable amount in a case in which the sensor receives photoelectrons exceeding the allowable amount by the pixel, for example. Although noise becomes larger than that of the camera C2 by including such a circuit, it is possible to obtain a device that is less likely to cause saturation of electrons. On the other hand, it is possible to obtain the camera C2 as a device with small noise although saturation of the pixel value is more likely to occur than in the camera C1 by adopting a configuration in which such a circuit is not included. Then, the camera C0 may be a device that is less likely to cause saturation and is less likely to cause noise.

The simulator 3 uses cameras C0, C1, and C2 to generate images captured by each of the cameras through simulation. The data generation system 1 outputs these three images as a set of training data. It is possible to obtain training data in optimization of the estimation model for estimating an image with a dynamic range of the camera C0 using images of the cameras C1 and C2 by acquiring the images captured at the same time inside the same CG model. Note that a plurality of sets of training data may be acquired by varying the imaging conditions, for example, the amount of light of the light source, the irradiation direction of light, the positions of the cameras, and the postures, for example, in various manners inside the same CG model.

Figure 6:
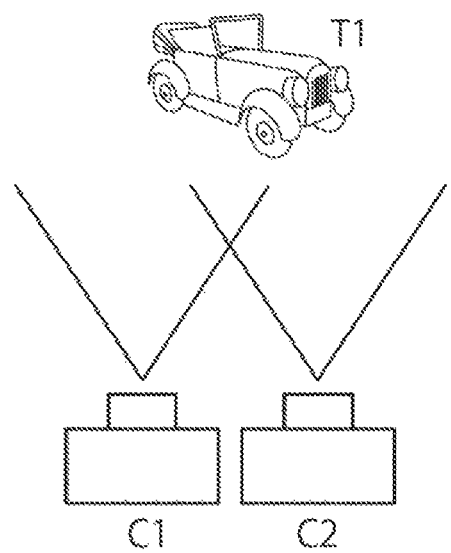
FIG. 6 is a diagram illustrating an example of camera disposition in a real world according to an embodiment.

FIG. 6 is a diagram illustrating the two cameras C1 and C2 for imaging a target T1 in a real world. The training device 4 optimizes an estimation model using images generated by the above data generation system 1. The estimation device 5 is configured to include the optimized estimation model and uses the images acquired under the imaging conditions of the cameras C1 and C2 illustrated in FIG. 5A as input images. Also, the image acquired under the imaging condition of the camera C0 is output as an estimation image. FIG. 6 illustrates the actual imaging conditions of the cameras C1 and C2 in FIG. 5A. On the contrary, cameras having the imaging conditions as illustrated in FIG. 5A inside the CG model are disposed on the basis of the imaging conditions in FIG. 6 having restriction of devices in reality.

Figure 7:
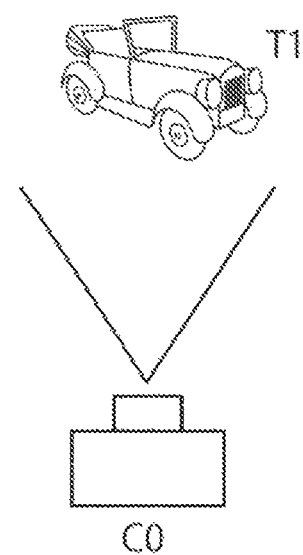
FIG. 7 is a diagram illustrating an example of camera disposition for acquiring an estimation image in a real world according to an embodiment.

On the other hand, FIG. 7 is a diagram illustrating a situation in which a real world is virtually imaged by the camera C0 that acquires an ideal HDR image.

As described above, the camera C1 is a camera that is less likely to cause saturation of a pixel image but is likely to cause noise, for example, and the camera C2 is a camera that is likely to cause saturation of a pixel value and is less likely to cause noise. It is possible to acquire an estimation image with an optimized dynamic range captured by the virtual camera C0 in FIG. 7 by inputting the images acquired by these two cameras into the estimation model optimized by using the training data illustrated in FIG. 5A.

The camera C0 may be a camera that cannot be disposed due to physical restrictions of the cameras C1 and C2, for example, the sizes of the casings or physical overlapping of the lens positions in reality. In this case, it is not possible to perform imaging with the camera C0 at the same time as the imaging of the cameras C1 and C2 and to acquire teaching data in the real world. Even in such a case, the data generation system 1 according to the present embodiment can acquire an ideal image of teaching data by using the CG model.

Although the three cameras are disposed at different positions in FIG. 5A, the camera C0 may be disposed at the same position as that of any one of the cameras C1 and C2. For example, the camera C0 may be disposed at the same position as that of the camera C1.

For example, the position of the camera C0 may be the same as the position of the camera C1. In this case, the same position means that the positions of the principal points of the lenses and the sensor planes of the cameras C0 and C1 are the same, for example. In a case in which such an imaging condition is adopted, and a user can view an image captured by the camera C1 through the device, for example, the estimation device 5 can estimate an image of a high dynamic range of the camera C1.

Also the number of cameras used for input images is not limited two, and the cameras may be configured of three or more cameras. In a device such as a smartphone with a trinocular camera, for example, the simulator 3 may acquire an image captured using each lens and an image that serves as teaching data to obtain three or more pieces of input data and teaching data as a set of training data.

Note that the input images for estimating an HDR image are not limited to images acquired by devices with different degrees of saturation of pixel value and levels of noise. For example, imaging conditions that the camera C1 may include a sensor that acquires sensing information of the sensor through logarithmic transformation and the camera C2 includes a sensor that acquires sensing information of the sensor through linear transformation may be set.

In another example, the imaging conditions may include the lengths of exposure times of the cameras C1 and C2 being different instead of performances of the lenses and the sensors. For example, the exposure time of the camera C1 may set to a short exposure time suitable for acquiring an image of a bright object, the exposure time of the camera C2 may be set to an exposure time that is sufficiently longer than the exposure time of the camera C1 to be suitable for acquiring an image of a dark object, and these may be used as imaging conditions.

According to the example, it is possible to appropriately acquire training data used to optimize an estimation model that performs HDR synthesis using images acquired by two or more cameras with different imaging conditions.

(Synthesis of TOF Image)

Although the above description is based on differences in lenses of the cameras, sensors, and the like that acquire visible light, the present invention is not limited thereto. Imaging conditions of the cameras C1 and C2 may be devices that acquire different kinds of sensing information. Some devices that acquire different kinds of sensing information will be described. For example, the camera C1 may be a camera that acquires visible light, and the camera C2 may be a camera that acquires a time-of-flight (TOF) image. Then, the camera C0 may generate an image based on acquisition of TOF image from the position of the camera C1.

It is possible to estimate an image in which the TOF information acquired by the camera C2 can be displayed in an overlapping manner on the RGB information acquired by the camera C1 in the cameras C1 and C2 with occurrence of a parallax in practice by assuming the camera C0. For example, it is possible to generate training data optimizing a model estimating, from the information acquired by each of the cameras C1 and C2, the TOF information at the position of the camera C1 from TOF information acquired at the position of the camera C2. Although it is not practically possible to dispose a device for acquiring the TOF image as the camera C0 at the same position as that of the camera C1, it is possible to virtually dispose the device for acquiring the TOF image at the position of the camera C1 by disposing a camera in a CG model.

According to the example, it is possible to generate training data for estimating the TOF image at the same position as that of the device for acquiring the RGB image. Although it is possible to dispose the device for acquiring the RGB image and the device for acquiring the TOF image at close positions, a parallax always occurs even if they are disposed at the close positions. According to the present method, it is possible to generate an image by eliminating such a parallax through simulation and thereby to acquire data by disposing the device for acquiring the RGB image and the device for acquiring the TOF image at exactly the same position. It is possible to estimate a combination of the RGB image and the TOF image with no parallax from combinations of RGB images and TOF images with parallaxes by optimizing the estimation model using the thus generated training data. As a result, it is possible to realize more accurate recognition of the position of the object.

Note that the acquisition of the distance information is not limited to the method based on TOF and may be realized by other methods. Also, the camera C0 may be located at the position of the camera C0 illustrated in FIG. 5A, for example, instead of the same position as that of the camera C1. In this case, the camera C0 may have two imaging conditions, for example, conditions of acquiring the RGB image and the TOF image at the position of the camera C0, and the simulator 3 may acquire the RGB image and the TOF image from the position of the camera C0 through simulation.

(High-Resolution Thermal Image)

Another example of the device that acquire different types of sensing information will be described. For example, the camera C1 may be a device that acquires an RGB image with high resolution, or may be a device that acquires a grayscale image with high resolution, and the camera C2 may be a device that acquires a thermal image. The thermal image may be acquired by a sensor that acquires a temperature, for example, a thermography using infrared rays, far-infrared rays, or the like. The camera C0 may acquire temperature information in the CG model through simulation, acquire the temperature information, and converts the temperature information into an image. In a case in which information regarding infrared rays is acquired, the camera C0 may be a device that acquires information of only infrared rays or may be a device that acquires infrared rays along with RGB information.

It is possible to optimize the estimation model that overlays the RGB image, the grayscale image, and the thermal image in a state with no parallax by using these images as training data. Similar to the above description, although it is difficult to acquire a visible image and a thermal image in a state with no parallax, it is not possible to satisfactorily acquire training data in the real world, it is possible to acquire training data with higher accuracy (with no parallax) by using the CG model. It is possible to acquire the visible image and the thermal image with no parallax from the visible image and the thermal image with a parallax by using the thus optimized estimation model.

(High-Resolution Image)

In a case in which an RGB image is acquired, light intensities of different colors via a filter, an organic photoelectric film, or the like are generally acquired and synthesized, and the resolution is thus degraded as compared with a case in which a grayscale image is acquired. For example, one pixel of a color image is defined with respect to four pixels of the grayscale image. It is also possible to realize an increase in resolution in the color image by using the method according to the present embodiment.

For example, the camera C1 may be a device that acquires a grayscale image with high resolution, and the camera C2 may be a device that includes a color filter of a Bayer array. Also, the camera C0 may be set as a device that acquires a color image with high resolution.

The camera C0 may acquire images filtered with the same color in all pixels at the same moment in accordance with the types of colors, for example, for three colors RGB. In the CG model, it is also possible to set a device that senses different pieces of information acquired at the same moment and at the same position in this manner. It is possible to acquire an image of each color with high resolution from the camera C0 in this manner and thereby to acquire a color image with high resolution.

Based on this, it is possible to generate training data for estimating the color image with high resolution acquired by the camera C0 from the grayscale image with high resolution acquired by the camera C1 and the color image with a lower resolution acquired by the camera C2. It is possible to generate a model for estimating the color image with high resolution from the grayscale image with high resolution and the color image with low resolution with parallax by using such training data. Note that the image with high resolution theoretically has resolution of 2×2 times as high as that of the image with low resolution in the example using a Bayer array.

Although the Bayer array has been adopted in the above description, the present invention is not limited thereto. Also, although RGB has been used for the synthesis of the camera C0, a complementary color system (CMY) may further be used, or other colors may be used. In other words, it is also possible to apply the present invention to an increase in resolution of an infrared camera and obtaining of a color image or to synthesis of multi-spectrum or hyper spectrum images. Moreover, black (K) may be used, and in this case, it is also possible to apply the present invention to an improvement in performance of printer or a scanner of a copy machine or the like. In another example, an image may be acquired by a sensor including a filter based on plasmon resonance. In this case, it is also possible to apply the present invention to various individual authentication device and the like.

(High Sensitivity and High Resolution Image)

Although the generation of a high-resolution image from images acquired by the various sensors has been described above, it is also possible to similarly generate an image with high sensitivity as training data and to perform estimation using it as an output of the estimation model.

For example, the camera C1 may set an imaging condition of using a sensor with a smaller pixel size than the camera C2. The camera C1 can acquire an image with higher resolution than the camera C2, and the camera C2 can acquire an image with higher sensitivity than the camera C1, by adopting such a setting. Also, the camera C0 sets an imaging condition that it has resolution of the camera C1 and has sensitivity corresponding to the pixels of the camera C2.

The data generation system 1 may generate training data using these high-resolution image and high-sensitivity image as input data and using a high-resolution and high-sensitivity image as output data. The estimation model optimized using the thus generated training data can estimate a high-resolution and high-sensitivity image from images with different resolutions and sensitivities acquired by cameras including pixels with different sizes.

As described above, according to the present embodiment, it is possible to freely generate, inside the CG model, the training data that serves as input/output data in optimization of the estimation model. In the real world, it is not possible to dispose the camera C0 such that it overlaps the cameras C1 and C2 due to a physical interference and the like based on the size of the casing of each camera. Also, it is also difficult to dispose the camera C0 at an ideal position with respect to the cameras C1 and C2 even if it is not performed at the same moment. According to the data generation system 1, it is possible to freely acquire images in such a case as well.

Second Embodiment

Although the estimation data has been acquired by setting various imaging conditions at the same position in a case in which teaching data is physically affected by an interference due to influences of casings and the like as imaging conditions in the first embodiment, it is also possible to further widen the imaging conditions. In the present embodiment, the data generation system 1 generates training data of a model that estimates an image acquired by a device with a predetermined image angle from images acquired by a plurality of devices with various image angles at different positions in an example.

Figure 8:
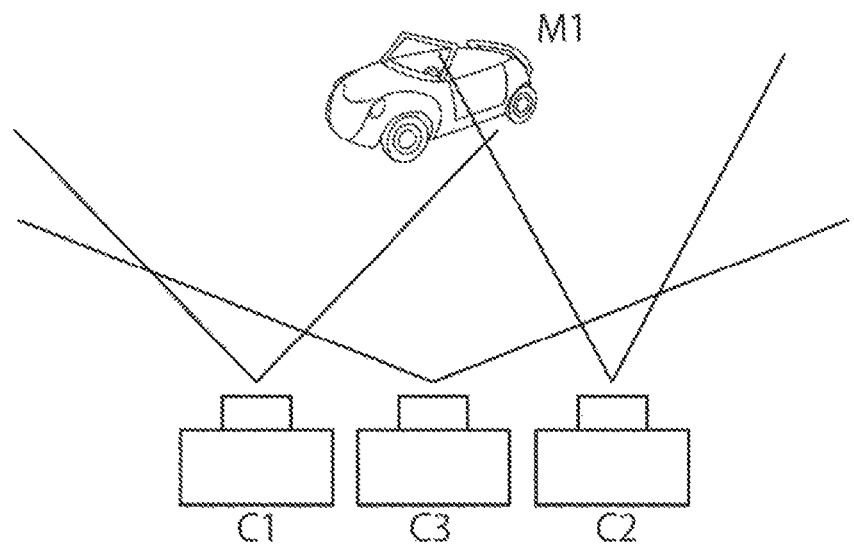
FIG. 8 is a diagram illustrating an example of camera disposition in a CG model according to an embodiment.
Figure 9A:
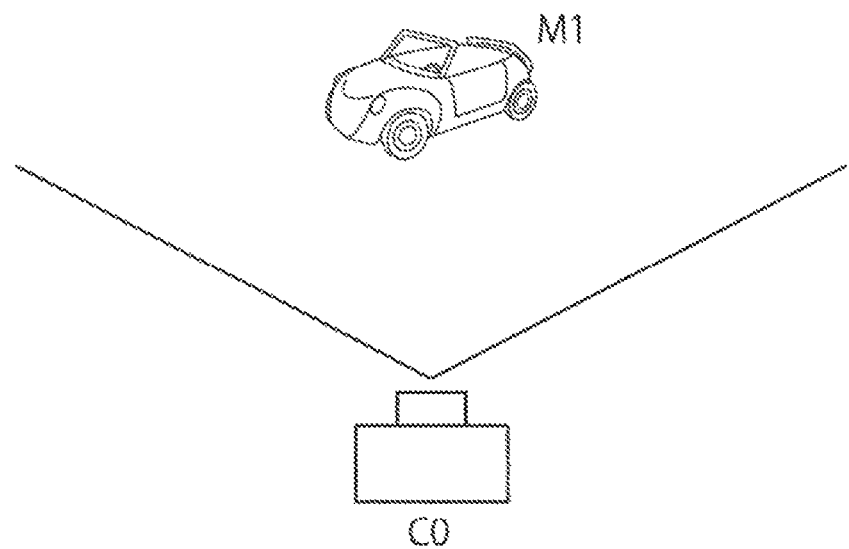
FIG. 9A is a diagram illustrating an example of camera disposition in a CG model according to an embodiment.
Figure 9B:
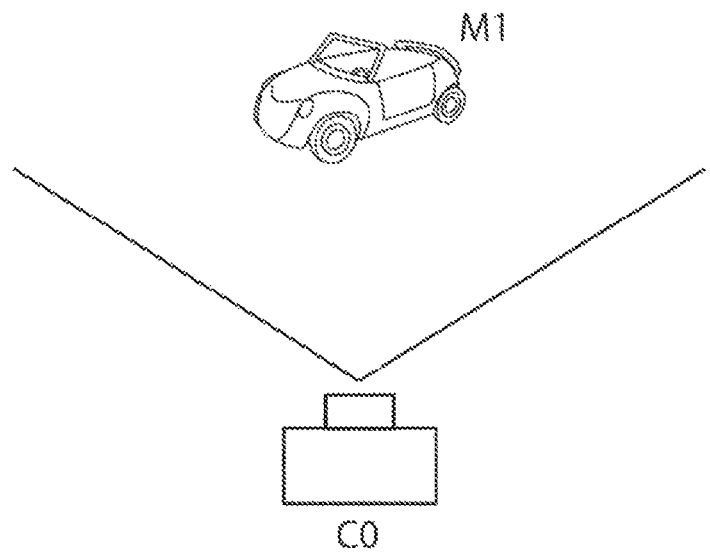
FIG. 9B is a diagram illustrating an example of camera disposition in a CG model according to an embodiment.
Figure 9C:
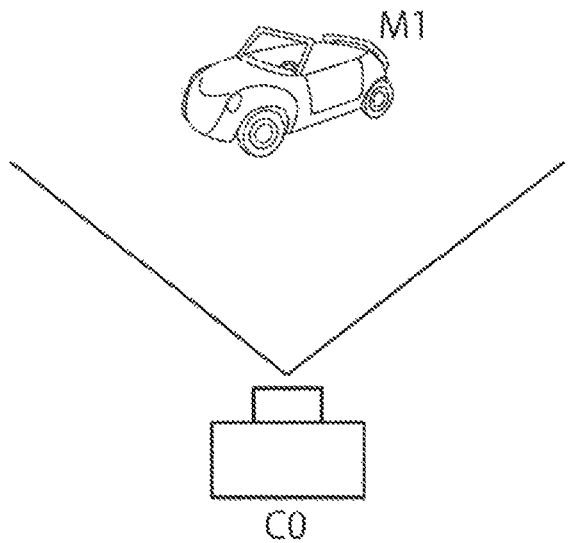
FIG. 9C is a diagram illustrating an example of camera disposition in a CG model according to an embodiment.
Figure 9D:
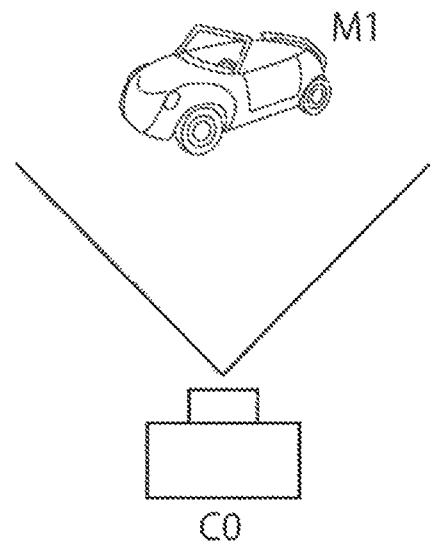
FIG. 9D is a diagram illustrating an example of camera disposition in a CG model according to an embodiment.
Figure 9E:
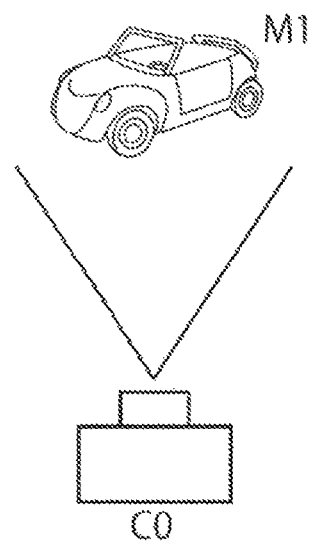
FIG. 9E is a diagram illustrating an example of camera disposition in a CG model according to an embodiment.

FIG. 8 is a diagram illustrating an example of camera disposition on simulation of acquiring data to be input to an estimation model in a CG model according to the present embodiment. As illustrated in FIG. 8, imaging conditions of cameras C1, C2, and C3 are set as cameras including optical systems with different image angles at different positions in the CG model.

For example, the camera C1 executes imaging by including a lens with a standard image angle, the camera C2 executes imaging by including a lens with a telephoto image angle, and the camera C3 executes imaging by including a lens with a wide image angle. Also, each camera is disposed at a position at which they do not physically interfere with each other such that it is possible to dispose them in a real space. Additionally, images are acquired through simulation under these imaging conditions.

FIGS. 9A to 9E are diagrams illustrating each imaging condition for acquiring teaching data for the input data acquired in FIG. 8. For example, there may be an imaging condition that the camera C0 is a device including a lens with an ultra-wide lens as in FIG. 9A.

In this case, training of a model for estimating an image acquired using an ultra-wide lens is realized using images acquired by the cameras C1, C2, and C3 illustrated in FIG. 8. This similarly applies to FIGS. 9B to 9E, and teaching data in accordance with each image angle is generated and output.

The training device 4 may optimize the estimation model based on each piece of teaching data. For example, images from the cameras C1, C2, and C3 illustrated in FIG. 8 may be input as input images to train an estimation model for estimating an estimation model of acquiring the image of an ultra-wide angle illustrated in FIG. 9A, an estimation model of acquiring the image of a wide angle illustrated in FIG. 9B and so forth.

In another example, the training device 4 may optimize, through training, one model for estimating an image of each piece of teaching data. The training device 4 may use images output from an output layer as five images for one estimation model, for example, and execute training of the estimation model such that the five images are images generated in the states of FIGS. 9A, 9B, . . . , 9E.

Figure 10:
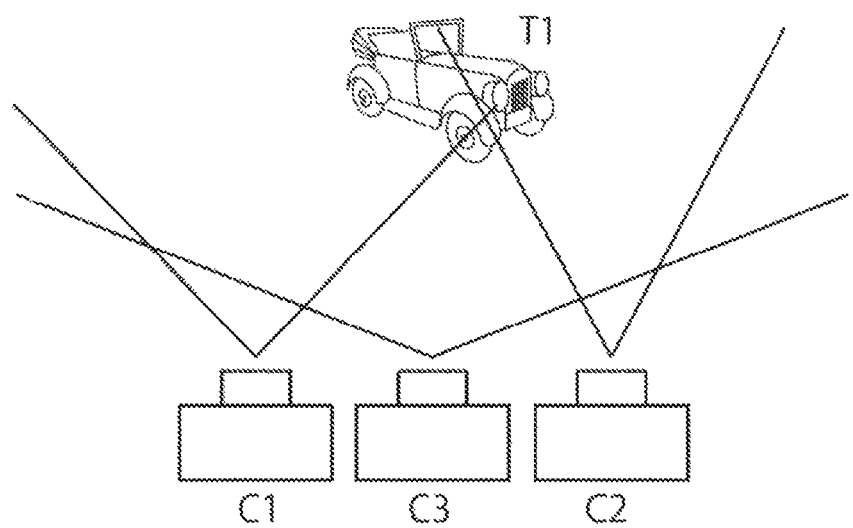
FIG. 10 is a diagram illustrating an example of camera disposition in a real world according to an embodiment.

FIG. 10 is a diagram illustrating cameras that acquire images in the real world in the thus generated estimation model. The estimation device 5 inputs images captured by the cameras C1, C2, and C3 in FIG. 10 to the estimation model generated on the basis of the images generated under the imaging conditions in FIGS. 8 and 9A to 9E.

Figure 11:
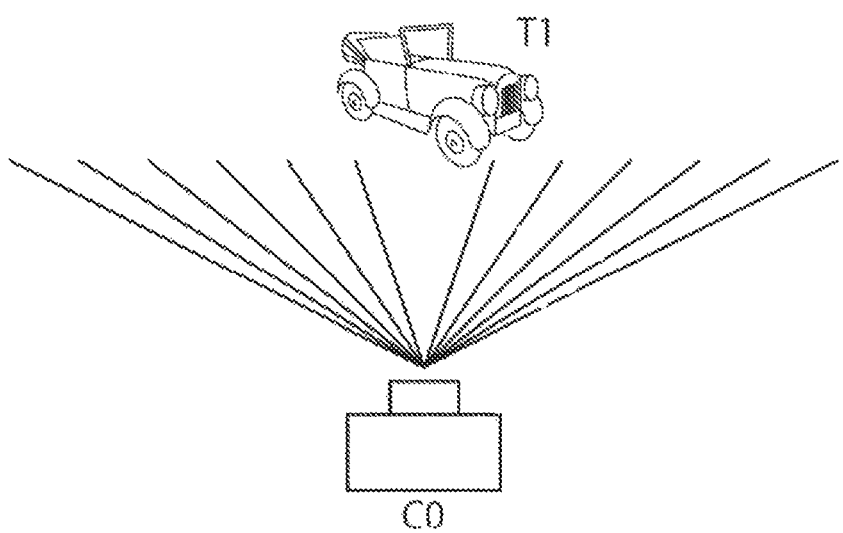
FIG. 11 is a diagram illustrating an example of camera disposition for acquiring an estimation image in a real world according to an embodiment.

FIG. 11 is a diagram illustrating an example of an image angle of an image output from the estimation model. The estimation device 5 inputs the aforementioned images to the estimation model and acquires an image of an image angle as in FIG. 11. As described above, estimation models may be different on the basis of the image angle of the estimated image, and one estimation model can output a plurality of image angles.

As described above, according to the present embodiment, it is possible to acquire training data for generating an estimation model for converting images captured by a compound eye camera having different image angles into an image captured at an arbitrary image angle.

Note that although only image angles have been referred to in the above description, it is a matter of course that the simulator 3 may also consider depths of field and images with different depths of field may be acquired. In this case, the image estimated by the estimation device 5 may be an image at an arbitrary image angle with a certain target T1 focused, for example. The thus acquired image is an image to which an appropriate effect such as blurring is applied to objects other than the focused object on the basis of the depths of field generated as teaching data, for example. On the contrary, it is also possible to generate teaching data for estimating a model for estimating an image focused at all positions with respect to an image focused at a predetermined distance or position and blurred at the other distances or positions, and to learn the model.

Third Embodiment

Although the cameras that acquire images as inputs of the estimation model have optical axes directed in the same direction in each of the aforementioned embodiments, the present invention is not limited thereto.

Figure 12:
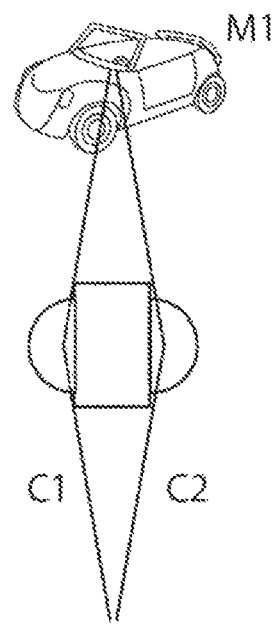
FIG. 12 is a diagram illustrating an example of camera disposition in a CG model according to an embodiment.

FIG. 12 is a diagram illustrating an example of camera disposition on simulation inside a CG model according to the present embodiment. The present embodiment relates to acquisition of an image achieved by a set of cameras capable of acquiring information of 360 degrees, for example. More specifically, the present embodiment assumes imaging achieved by an omnidirectional camera, for example.

Cameras C1 and C2 include fish-eye lenses directed in opposite directions and having image angles of greater than 180 degrees, for example. The cameras C1 and C2 are disposed such that they do not physically and mechanically interfere with each other. It is difficult to cause positions of principal points of the cameras disposed in this manner to coincide with each other. It is thus not possible to completely remove joints of stitched images. Thus, two cameras with primary points coinciding with each other in the CG model are disposed, and images captured under imaging conditions of these cameras are generated by the simulator 3.

Figure 13A:
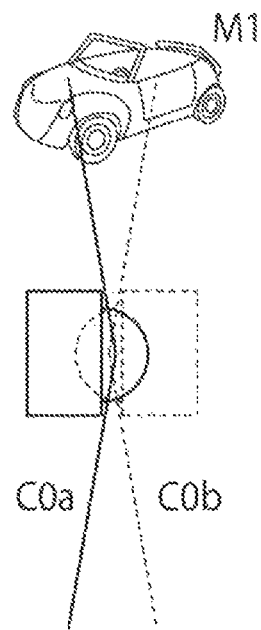
FIG. 13A is a diagram illustrating an example of camera disposition in a CG model according to an embodiment.
Figure 13B:
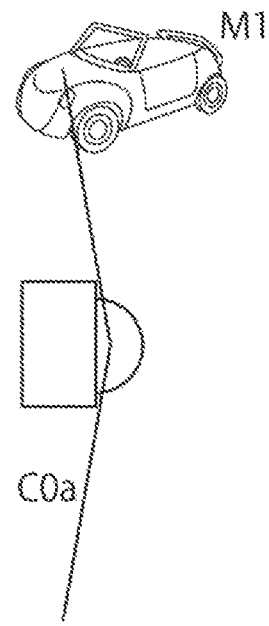
FIG. 13B is a diagram illustrating an example of camera disposition in a CG model according to an embodiment.
Figure 13C:
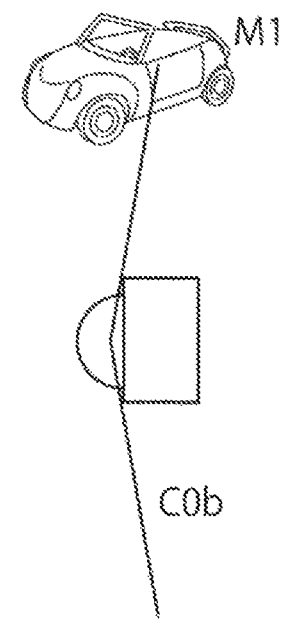
FIG. 13C is a diagram illustrating an example of camera disposition in a CG model according to an embodiment.

FIG. 13A is a diagram illustrating an example of cameras on simulation in which primary points placed inside the CG model coincide with each other. As illustrated in FIG. 13A, cameras C0a and C0b are disposed inside the CG model such that primary points of the lenses coincide with each other. FIGS. 13B and 13C are diagrams that separately illustrate the cameras C0a and C0b for easy understanding of overlapping parts. The cameras C0a and C0b are disposed inside the CG model such that the primary points coincide with each other and imaging directions are opposite directions as illustrated in these drawings. For example, an imaging condition that the cameras C0a and C0b are disposed such that the optical axis of the camera C0a coincides with the optical axis of the camera C1 and the optical axis of the camera C0b coincides with the optical axis of the camera C2.

Note that it is also possible to perform control such that the cameras do not image each other by disposing the cameras C0a and C0b inside the CG model. For example, it is assumed that the camera C0b is not disposed when an image captured by the camera C0a is generated, and it is assumed that the camera C0a is not disposed when an image captured by the camera C0b is generated. In this manner, it is possible to realize the imaging such that casings of the mutual cameras do not disturb the captured images.

The data generation system 1 outputs a set of the image data generated under the imaging condition in FIG. 12 and the image data generated under the imaging condition in FIG. 13 as training data. The training device 4 optimizes the model to estimate the image acquired under the condition in FIG. 13 from the image acquired under the condition in FIG. 12 using the training data. In other words, optimization of the estimation model is executed such that the images captured by the cameras C0a and C0b are output once the images captured by the cameras C1 and C2 are input.

Figure 14:
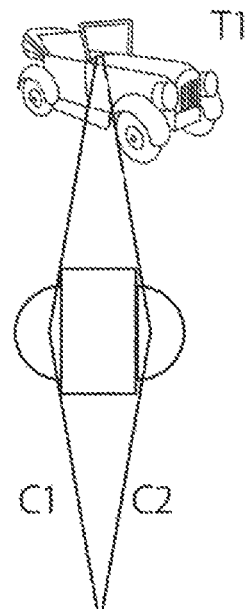
FIG. 14 is a diagram illustrating an example of camera disposition in a real world according to an embodiment.
Figure 15:
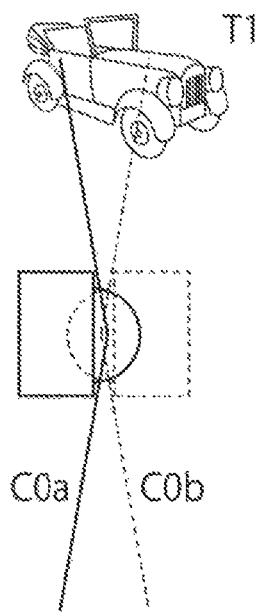
FIG. 15 is a diagram illustrating an example of camera disposition for acquiring an estimation image in a real world according to an embodiment.

The estimation device 5 estimates images including the target T1 captured by the cameras C0a and C0b as illustrated in FIG. 15 from the images including the target T1 and captured by the cameras C1 and C2 as illustrated in FIG. 14, using the thus optimized model. The thus estimated images are images in which the positions of the primary points of the lenses coincide with each other, and an overlapping region in each of the images is wider as compared with those in the original images captured by the cameras C1 and C2. Therefore, it is possible to acquire images that can more precisely realize correction of a joint and the like by using the images captured by the cameras C0a and C0b acquired via the estimation model as compared with stitching of the images captured by the cameras C1 and C2.

As described above, according to the present embodiment, it is possible to acquire training data that optimizes a model for estimating images acquired by cameras having primary points coinciding with each other and imaging opposite directions by performing imaging at the same time with the cameras on the simulation in which the primary points are caused to coincide with each other inside the CG model even with an omnidirectional camera with which it is difficult to perform imaging at the same time with the primary points caused to coincide with each other due to a physical problem in the real world.

Note that Figs, 13A to 13C illustrate just an example, and the imaging condition of the camera C0 is not limited thereto.

Figure 16:
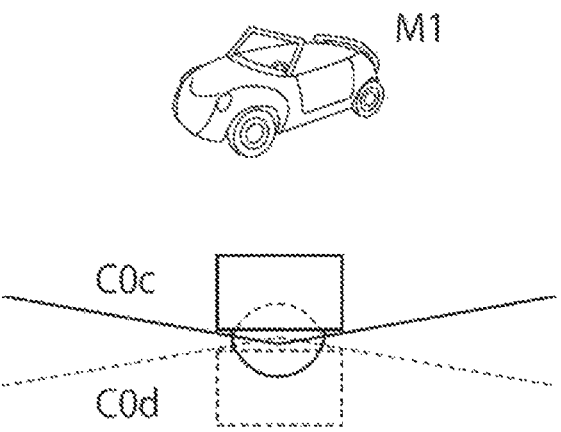
FIG. 16 is a diagram illustrating an example of camera disposition in a CG model according to an embodiment.

FIG. 16 is a diagram illustrating another imaging condition of the camera C0. Cameras C0c and C0d that have optical axes directed in different directions and image opposite directions may be used without causing the cameras to coincide with the optical axes like the cameras C0a and C0b illustrated in FIG. 16. Also, in addition to the situation in FIG. 13A, the camera in FIG. 16 may be further added to enable estimation to be executed.

Figure 17A:
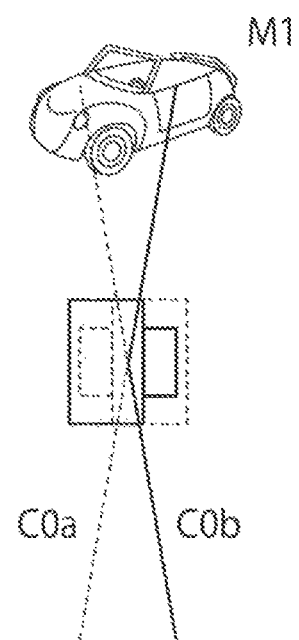
FIG. 17A is a diagram illustrating an example of camera disposition in a CG model according to an embodiment.
Figure 17B:
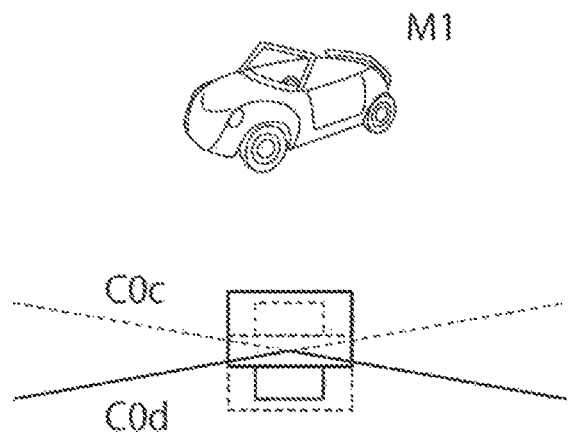
FIG. 17B is a diagram illustrating an example of camera disposition in a CG model according to an embodiment.

For enabling three or more cameras to be used in this manner, it is also conceivable to set an image angle other than the ultra-wide angle for the lens. FIGS. 17A and 17B are diagrams illustrating an example in which the lens is not an ultra-wide lens. For example, three or more cameras with standard image angles may be disposed as cameras for acquiring teaching data with respect to the cameras C1 and C2 in FIG. 12. FIGS. 17A and 17B illustrate the example, and the simulator 3 may generate images captured by four cameras C0a, C0b, C0c, and C0d having coinciding primary points as teaching data. For example, it is also possible to curb distortion of the teaching data by employing an imaging condition that the standard image angle is included, for example.

Furthermore, the teaching data may be a stitched image rather than the image captured by the camera C0. In this case, the simulator 3 may generate an image captured such that an accurate stitching image can be acquired by an arbitrary plurality number of cameras C0 sharing the center of the positions of the primary points of the cameras C1 and C2 as a primary point, for example. The simulator 3 acquires a stitching image through an arithmetic operation from the thus generated plurality of images and outputs, as training data, the stitching image as teaching data along with data imaged by the cameras C1 and C2 in a set.

The training device 4 executes optimization of the estimation model that outputs the stitching image that is the teaching data once the images captured by the cameras C1 and C2 are input, Also, the estimation device 5 may estimate the stitching image from the input images by using the estimation model for which the optimization has been completed.

Fourth Embodiment

In a mobile terminal, there is a likelihood that the relative position of a compound eye camera and the direction of an optical axis deviate depending on the form of utilization or an environment of utilization. If the mobile terminal is put into a pocket when it is carried, for example, there may be a case in which deviation occurs due to distortion of the casing, and there is a likelihood that distortion occurs in the casing due to a temperature used. The data generation system 1 according to the present embodiment generates training data generates training data that acquires information for correcting such deviation of the relative position and the deviation of the direction of the optical axis.

Figure 18:
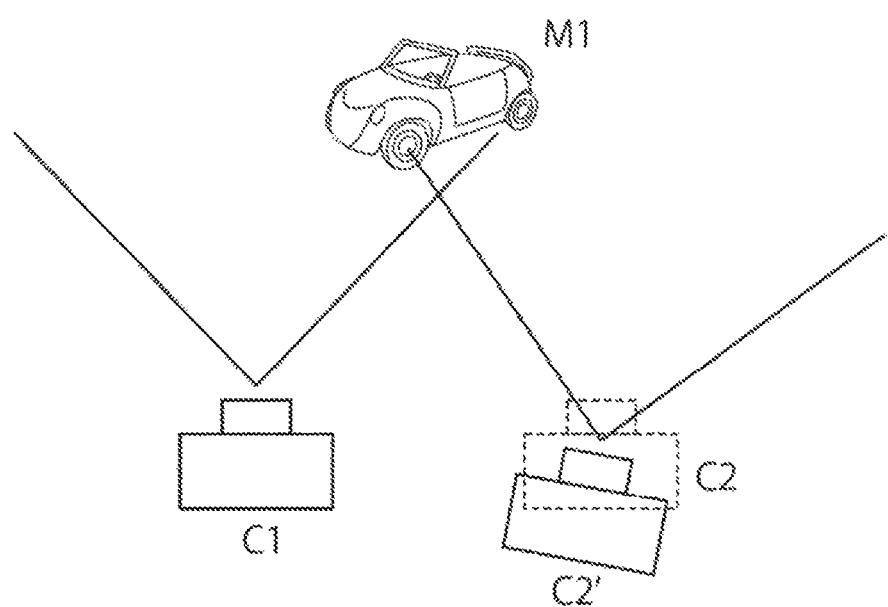
FIG. 18 is a diagram illustrating an example of camera disposition in a CG model according to an embodiment.

FIG. 18 is a diagram illustrating an example of camera disposition on simulation in a CG model according to an embodiment. As illustrated in the drawing, cameras C1 and C2' are disposed in the CG model. The correct position and direction of the camera C2 are illustrated by the dotted line. On the contrary, the camera C2' is disposed with the position and the direction deviating therefrom. Here, the position refers to the relative position of the camera C2 with respect to the camera C1, for example. In this case, the teaching data may be deviation from the relative position and deviation of the optical axis, for example. In other words, the deviation of the relative position of the camera C2 with respect to the camera C1 and of the optical axis of the camera C2 with respect to the optical axis of the camera C1 may be used as teaching data.

In another example, the cameras C1 and C2 may be disposed such that correct relative positions and a correct relative angle between the optical axes are achieved, and these may be defined as a first predetermined position, a second predetermined position, a first optical axis direction, and a second optical axis direction. In this case, at least one of the position and the direction of the optical axis of the camera C1 may be caused to randomly deviate from the first predetermined position and the first optical axis direction, at least one of the position and the direction of the optical axis of the camera C2 may be caused to randomly deviate from the second predetermined position and the second optical axis direction, and the deviation may be converted into relative deviation and used as teaching data.

Here, random deviation is defined as minute deviation. The minute deviation is defined as deviation of the position or the direction with which the cameras C1 and C2 deviate to such an extent that the casings including the C1 and C2 do not break, for example.

With the cameras in the deviating state in this manner disposed inside the CG model, the simulator 3 may generate the images captured by these cameras. A set of the generated image and the deviation of the position and the direction as teaching data is used as training data. An imaging condition having various kinds of deviation that satisfy the above constraint condition may be set to generate training data.

Figure 19:
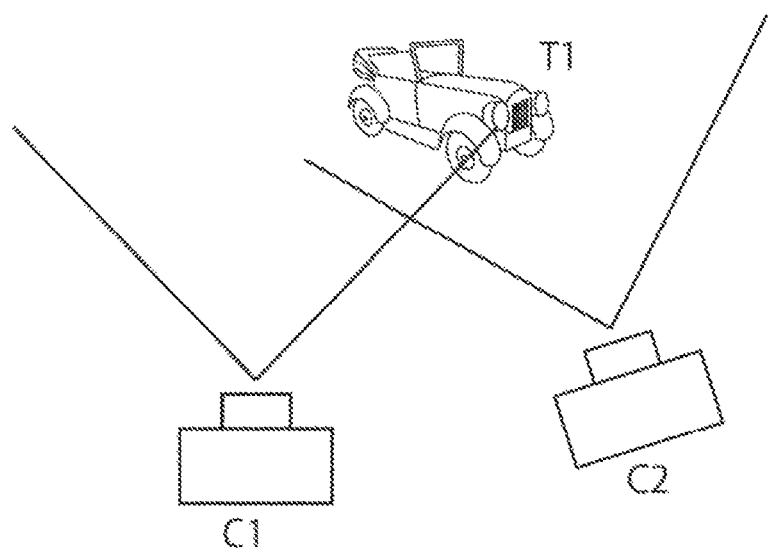
FIG. 19 is a diagram illustrating an example of camera disposition for acquiring an estimation image in a real world according to an embodiment.

The training device 4 executes optimization of an estimation model that outputs deviation of relative positions and deviation of directions of optical axes once two images are input. The estimation device 5 estimates and outputs the deviation of the relative positions and the deviation of the optical axes from two images as illustrated in FIG. 19 by using the estimation model optimized by the training device 4.

Although such a configuration can be realized by an ordinary sensor, it is possible to further accurately realize the configuration by using a monocular device capable of acquiring a parallax. The simulator 3 may set the camera having such a sensor as an imaging condition. As a sensor that acquires a monocular parallax image, a 2×2 on-chip lens (OCL) element having 2×2 light receiving elements in a pixel corresponding to one on-chip lens, for example, may be used.

Figure 20:
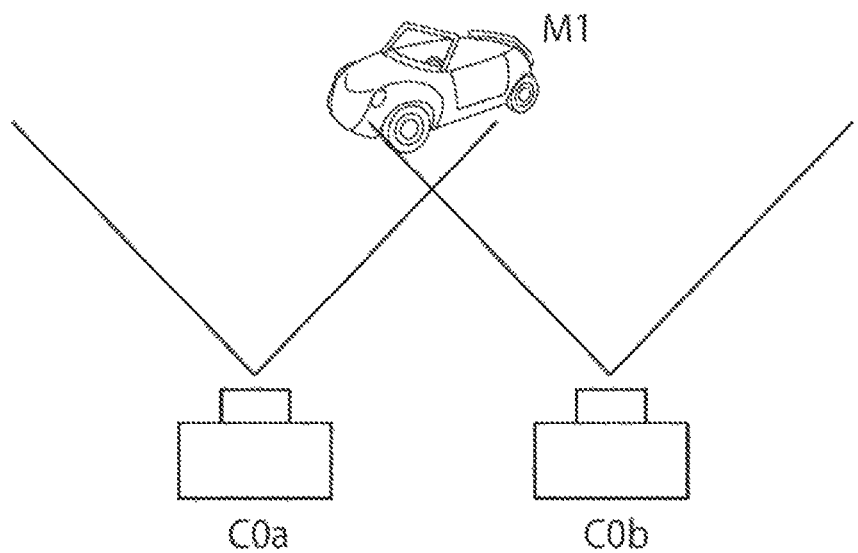
FIG. 20 is a diagram illustrating an example of camera disposition in a CG model according to an embodiment.

FIG. 20 is a diagram illustrating an example of camera disposition on the simulation illustrating another example of the present embodiment. For example, the teaching data may not be numerical data such as positional deviation and optical axis deviation as described above, the cameras C0a and C0b may be disposed to have ideal positions and directions of the cameras C1 and C2 similarly to the aforementioned embodiments. Also, the simulator 3 may generate data imaged by these cameras C0a and C0b, and the data may be used as teaching data. Even in a case in which such data is acquired, the first predetermined position, the second predetermined position, the first optical axis direction, and the second optical axis direction described above may be used. In other words, it is possible to realize the acquisition by disposing the cameras C0a and C0b in accordance with these positions and directions inside the CG model with respect to the cameras C1 and C2.

Figure 21:
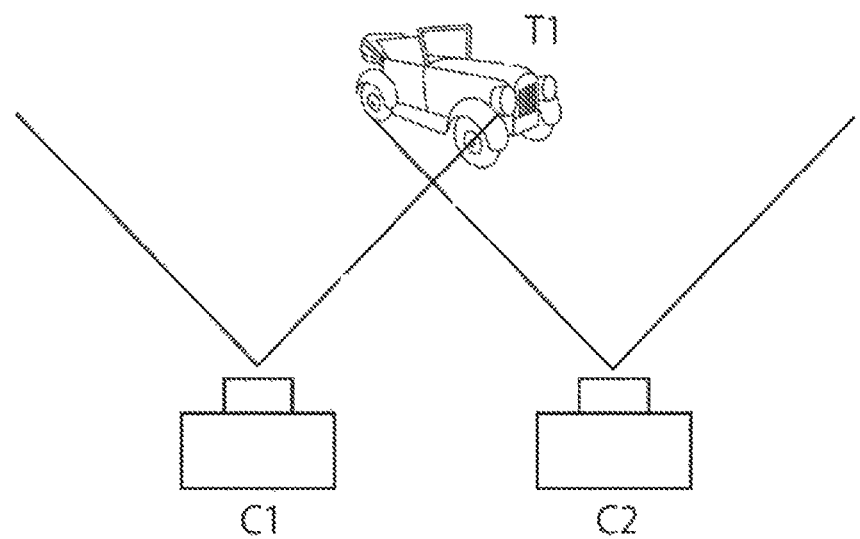
FIG. 21 is a diagram illustrating an example of camera disposition for acquiring an estimation image in a real world according to an embodiment.

FIG. 21 is a diagram illustrating ideal relative disposition of the cameras C1 and C2 in the real world. The data generation system 1 can generate training data that optimizes an estimation model that corrects images having deviation of the relative positions and deviation of optical axes as in FIG. 19 into images captured by the cameras as illustrated in FIG. 21 by acquiring training data in the state illustrated in FIG. 20.

As described above, according to the present embodiment, it is possible to acquire training data for generating an estimation model that estimates deviation of the relative positions of the cameras and deviation of the optical axes or estimates an image in which the deviation of the relative positions and the deviation of the optical axes are corrected. In either case, it is possible to acquire accurate data by using imaging conditions such as disposition and the like in the CG model in a state in which it is difficult to obtain correct answer data in the real world and thereby to improve estimation accuracy of the estimation model.

Each of the aforementioned embodiments may be applied in an overlapping manner within a range in which it can be appropriately applied.

Some or all of the aspects of the present disclosure may be implemented by a program. The program may be stored in storage units 302, 402, and 502 such that information processing by software is specifically realized by hardware. Also, a part or entirety of the processing may be executed by a processor such as a central processing unit (CPU) or a graphics processing unit (GPU) or may be implemented by hardware by various analog circuits or digital circuits, such as a field programmable gate array (FPGA), an application specific integrated circuit (ASIC), or a digital signal processor (DSP), for example.

Application Example Using AI

Figure 22:
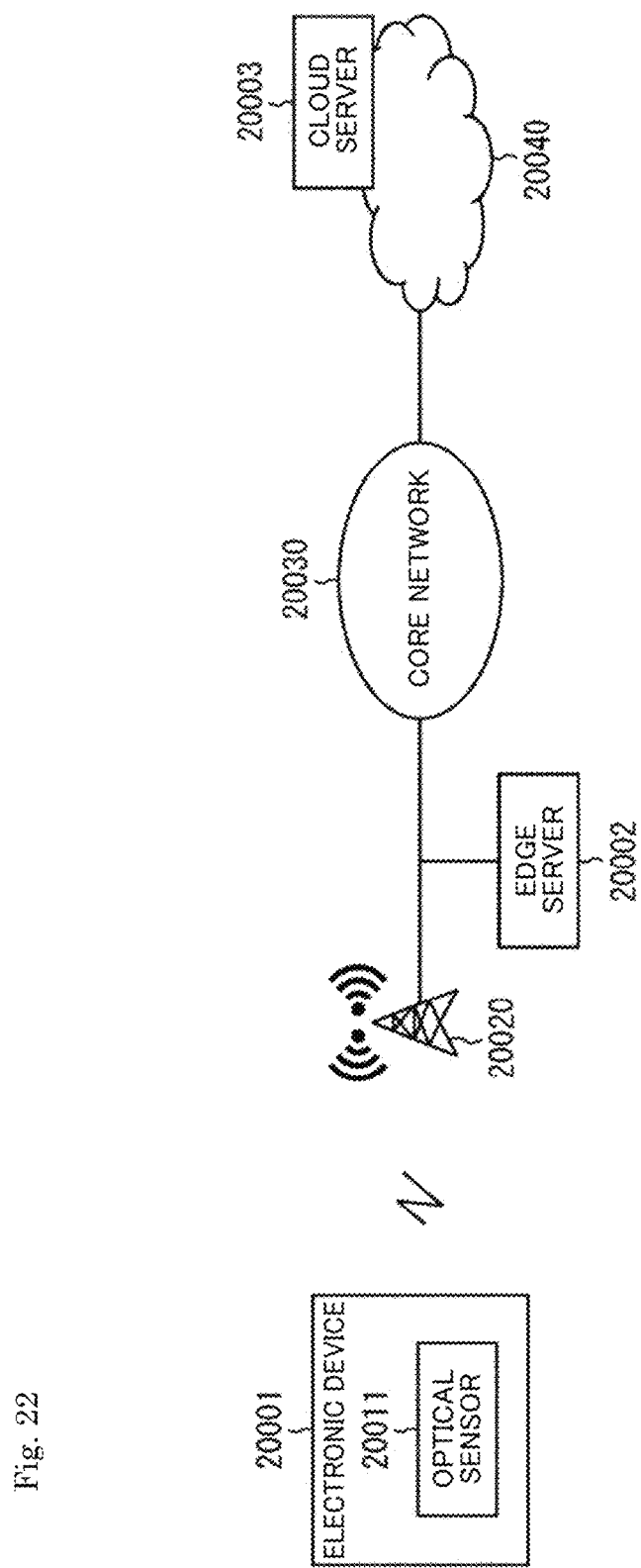
FIG. 22 is a block diagram illustrating a configuration example of a system including a device that performs AI processing.

A configuration to which the technique according to the present disclosure (the present technique) is applied can use artificial intelligence (AI) such as machine learning. FIG. 22 illustrates a configuration example of a system including a device that performs AI processing.

The electronic device 20001 is a mobile terminal such as a smartphone, a tablet-type terminal, or a mobile phone. The electronic device 20001 includes an optical sensor 20011 to which the technique according to the present disclosure is applied. Note that the optical sensor 20011 can configure a function of a camera, for example, in the electronic device 20001, and one or more optical sensors 20011 may be included although not illustrated in the drawing. The optical sensor is a sensor (image sensor) that converts light into an electrical signal. The electronic device 20001 can be connected to the network 20040 such as the Internet via a core network 20030 by being connected to a base station 20020 placed at a predetermined location through wireless communication that is compatible with a predetermined communication scheme.

An edge server 20002 for realizing mobile edge computing (MEC) is provided at a position that is closer to the mobile terminal such as a position between the base station 20020 and the core network 20030. A cloud server 20003 is connected to the network 20040. The edge server 20002 and the cloud server 20003 can perform various kinds of processing in accordance with purposes. Note that the edge server 20002 may be provided inside the core network 20030.

The electronic device 20001, the edge server 20002, the cloud server 20003, or the optical sensor 20011 perform AI processing. The AI processing is processing of the technique according to the present disclosure using AI such as machine learning. The AI processing includes learning processing and inference processing. The learning processing is processing of generating a learning model. Also, the learning processing also includes re-learning processing, which will be described later. The inference processing is processing of performing inference using the learning model. Hereinafter, performing the processing regarding the technique according to the present disclosure without using AI will be referred to as ordinary processing for distinction from the AI processing.

The electronic device 20001, the edge server 20002, the cloud server 20003, or the optical sensor 20011 realizes the AI processing by the processor such as a central processing unit (CPU) executing the program or by using dedicated hardware such as a processor specialized in a specific purpose. As the processor specialized in a specific purpose, it is possible to use a graphics processing unit (GPU), for example.

Figure 23:
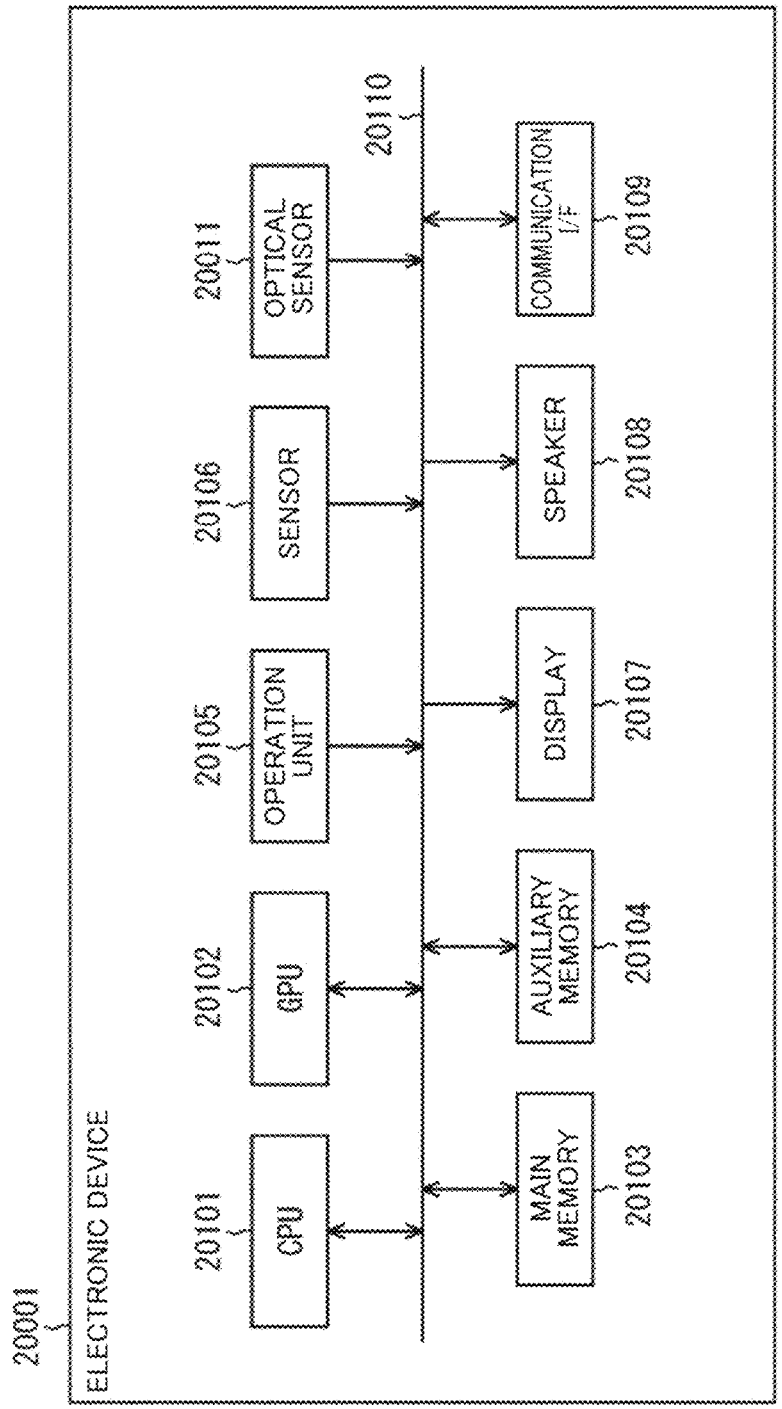
FIG. 23 is a block diagram illustrating a configuration example of an electronic device.

FIG. 23 illustrates a configuration example of the electronic device 20001. The electronic device 20001 includes a CPU 20101 that controls operations of each part and performs various kinds of processing, a GPU 20102 specialized in image processing and parallel processing, a main memory 20103 such as a dynamic random access memory (DRAM), and an auxiliary memory 20104 such as a flash memory.

The auxiliary memory 20104 records the program for AI processing and data such as various parameters. The CPU 20101 develops the program and the parameters recorded in the auxiliary memory 20104 in the main memory 20103 and executes the program. Alternatively, the CPU 20101 and the GPU 20102 develop the program and the parameters recorded in the auxiliary memory 20104 in the main memory 20103 and execute the program. It is thus possible to use the GPU 20102 as a general-purpose computing on graphics processing units (GPGPU).

Note that the CPU 20101 and the GPU 20102 may be configured as a system on a chip (SoC). In a case in which the CPU 20101 executes the program for AI processing, the GPU 20102 may not be provided.

The electronic device 20001 further includes an optical sensor 20011 to which the technique according to the present disclosure is applied, an operation unit 20105 such as a physical button or a touch panel, a sensor 20106 including at least one or more sensors, a display 20107 that displays information such as an image or a text, a speaker 20108 that outputs sound, a communication I/F 20109 such as a communication module that is compatible with a predetermined communication scheme, and a bus 20110 that connects these components.

The sensor 20106 may include at least one or more of various sensors such as an optical sensor (image sensor), a sound sensor (microphone), a vibration sensor, an acceleration sensor, an angular speed sensor, a pressure sensor, an odor sensor, and a biosensor. In the AI processing, it is possible to use data acquired from at least one or more sensors in the sensor 20106 along with image data acquired from the optical sensor 20011 as described above. In this manner, it is possible to realize AI processing adapted to various situations by a technique of multimodal AI by using data obtained from the various kinds of sensors along with the image data.

Note that data obtained by integrally processing image data acquired by two or more optical sensors by a sensor fusion technique may be used for the AI processing as described above. The two or more optical sensors may be a combination of the optical sensor 20011 and the optical sensor in the sensor 20106, or a plurality of optical sensors may be included in the optical sensor 20011. For example, the optical sensors include an RGB visible light sensor, a distance measurement sensor such as time of flight (ToF), a polarization sensor, an event-based sensor, a sensor that acquires an IR image, a sensor capable of acquiring multiple wavelengths, and the like. In other words, at least one piece of data may be obtained by a polarization sensor or an event-based sensor in a further non-limited example in the aforementioned embodiments.

In the electronic device 20001, a processor such as the CPU 20101 or the GPU 20102 can perform the AI processing. In a case in which the processor of the electronic device 20001 performs the inference processing, it is possible to start the processing without taking time after the optical sensor 20011 acquires image data and thereby to perform the processing at a high speed. Therefore, according to the electronic device 20001, the user can perform an operation without any uncomfortable feeling due to a delay when the inference processing is used for a purpose such as an application requiring transmission of information in a short delay time. Also, in a case in which the processor of the electronic device 20001 performs the AI processing, it is possible to realize the processing at low cost without any need to use a communication line, a computer device for a server, and the like as compared with a case in which a server such as a cloud server 20003 is used.

Figure 24:
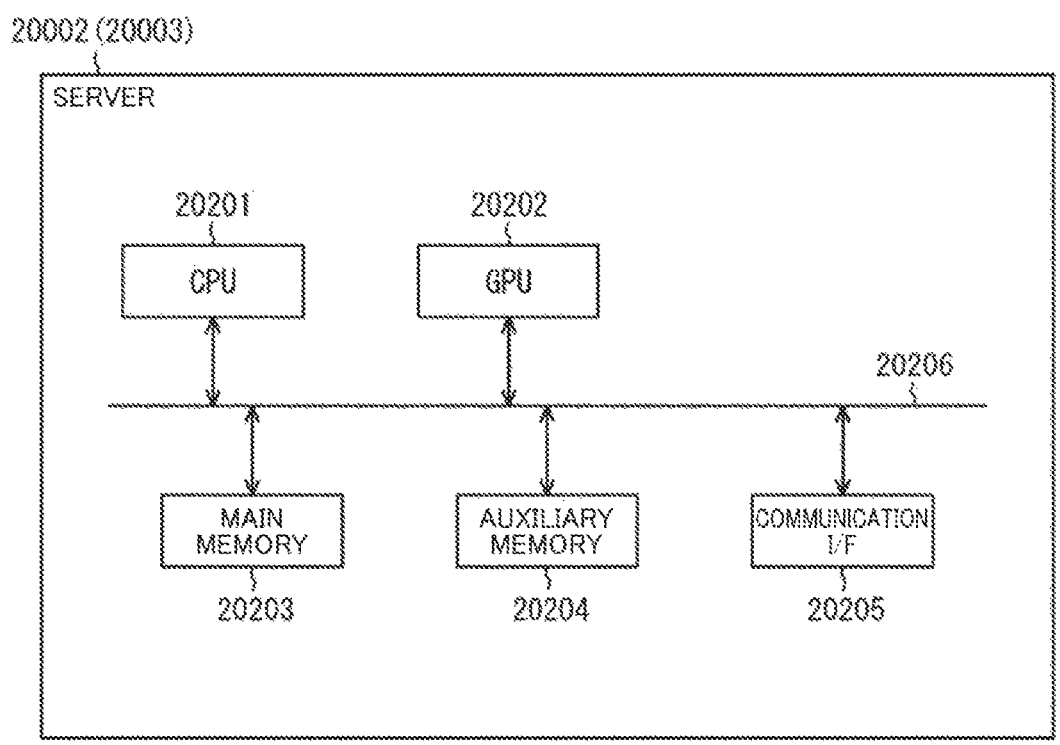
FIG. 24 is a block diagram illustrating a configuration example of an edge server or a cloud server.

FIG. 24 illustrates a configuration example of the edge server 20002. The edge server 20002 includes a CPU 20201 that controls operations of each part and performs various kinds of processing and a GPU 20202 specialized in image processing and parallel processing. The edge server 20002 further includes a main memory 20203 such as a DRAM, an auxiliary memory 20204 such as a hard disk drive (HDD) or a solid state drive (SSD), and a communication I/F 20205 such as a network interface card (NIC), and these components are connected to a bus 20206.

The auxiliary memory 20204 records the program for AI processing and data such as various parameters. The CPU 20201 develops the program and the parameters recorded in the auxiliary memory 20204 in the main memory 20203 and executes the program. Alternatively, the GPU 20202 can be used as a GPGPU by the CPU 20201 and the GPU 20202 developing the program and the parameters recorded in the auxiliary memory 20204 in the main memory 20203 and executing the program. Note that in the case in which the CPU 20201 executes the program for AI processing, the GPU 20202 may not be provided.

In the edge server 20002, the processor such as the CPU 20201 or the GPU 20202 can perform the AI processing. In a case in which the processor of the edge server 20002 performs the AI processing, the edge server 20002 is provided at a position closer to the electronic device 20001 than the cloud server 20003, and it is thus possible to realize a decrease in delay of the processing. Also, the edge server 20002 has higher processing ability such as a computing speed as compared with the electronic device 20001 and the optical sensor 20011 and can thus be configured for a general purpose. Therefore, in the case in which the processor of the edge server 20002 performs the AI processing, it is possible to perform the AI processing as long as data can be received regardless of differences in specifications and performances of the electronic device 20001 and the optical sensor 20011. In the case in which the edge server 20002 performs the AI processing, it is possible to reduce a processing burden of the electronic device 20001 and the optical sensor 20011.

Since the configuration of the cloud server 20003 is similar to the configuration of the edge server 20002, description will be omitted.

In the cloud server 20003, the processor such as the CPU 20201 or the GPU 20202 can perform the AI processing. The cloud server 20003 has high processing ability such as a computing speed as compared with the electronic device 20001 and the optical sensor 20011 and can thus be configured for a general purpose. Therefore, in the case in which the processor of the cloud server 20003 performs the AI processing, it is possible to perform the AI processing regardless of differences in specifications and performances of the electronic device 20001 and the optical sensor 20011. Also, in a case in which it is difficult for the processor of the electronic device 20001 or the optical sensor 20011 to perform the AI processing with a large burden, the processor of the cloud server 20003 can perform the AI processing with the large burden and provide a feedback of the processing result to the processor of the electronic device 20001 or the optical sensor 20011.

Figure 25:
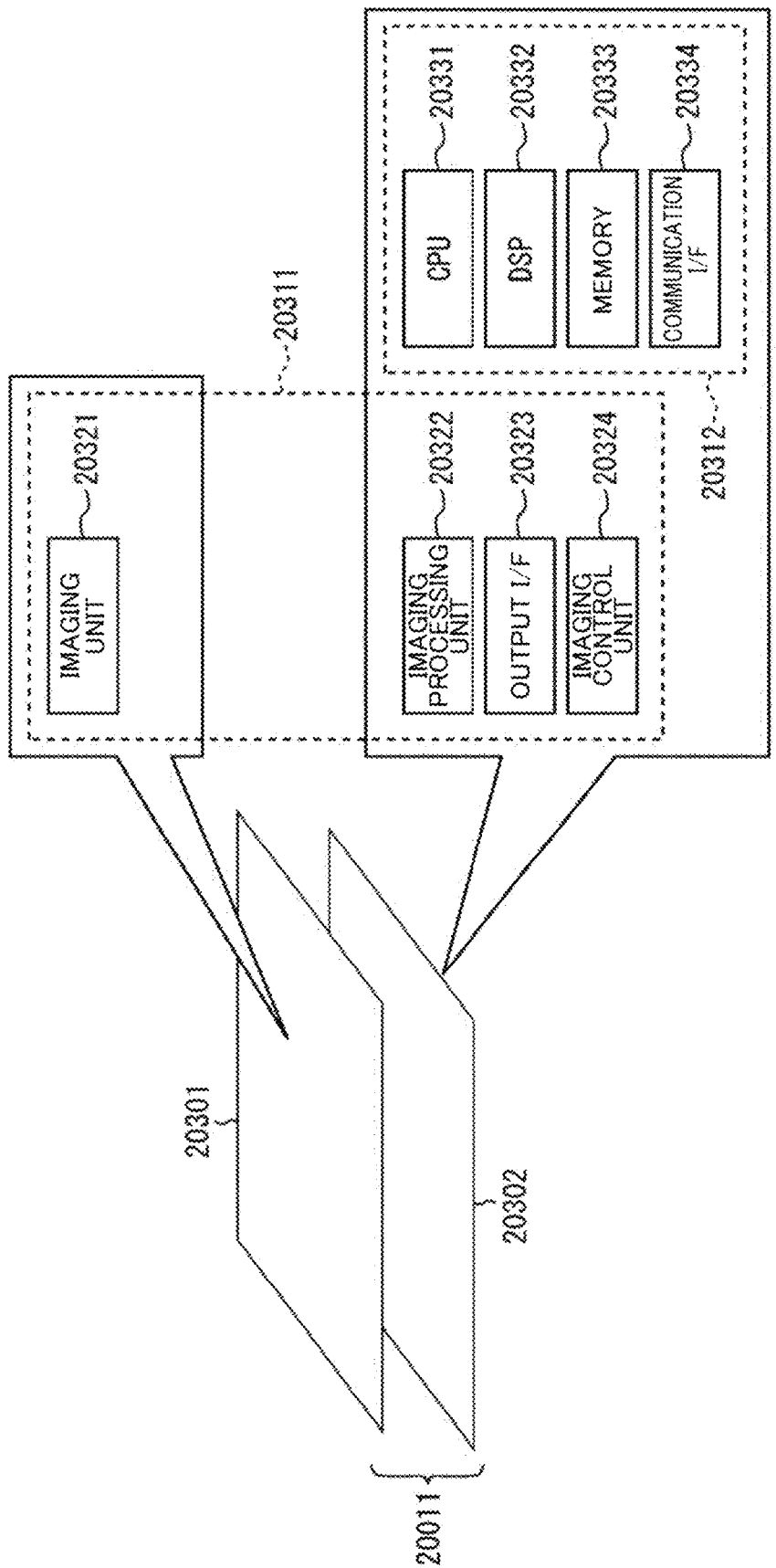
FIG. 25 is a block diagram illustrating a configuration example of an optical sensor.

FIG. 25 illustrates a configuration example of the optical sensor 20011. The optical sensor 20011 can be configured as one-chip semiconductor device having a laminated structure in which a plurality of substrates are laminated, for example. The optical sensor 20011 is configured by two substrates, namely a substrate 20301 and a substrate 20302 being laminated. Note that the configuration of the optical sensor 20011 is not limited to the laminated structure, and for example, a substrate including an imaging unit may include a processor, such as a CPU or a digital signal processor (DSP) that performs AI processing.

An imaging unit 20321 configured by a plurality of pixels aligned in a two-dimensional manner is mounted on the substrate 20301 that is an upper layer. An imaging processing unit 20322 that performs processing regarding capturing of an image performed by the imaging unit 20321, an output I/F 20323 that outputs a captured image and a signal processing result to the outside, and an imaging control unit 20324 that controls capturing of an image performed by the imaging unit 20321 are mounted on the substrate 20302 that is a lower layer. The imaging unit 20321, the imaging processing unit 20322, the output I/F 20323, and the imaging control unit 20324 configure an imaging block 20311.

Also, a CPU 20331 that performs control of each part and various kinds of processing, a DSP 20332 that performs signal processing using a captured image, information from the outside, and the like, a memory 20333 such as a static random access memory (SRAM) or a dynamic random access memory (DRAM), and a communication I/F 20334 that exchanges necessary information from the outside are mounted on the substrate 20302 that is the lower layer. The CPU 20331, the DSP 20332, the memory 20333, and the communication I/F 20334 configure a signal processing block 20312. At least one processor out of the CPU 20331 and the DSP 20332 can perform AI processing.

It is possible to mount the signal processing block 20312 for AI processing on the substrate 20302 that is the lower layer in the laminated structure in which a plurality of substrates are laminated. Thus, since image data acquired by the imaging block 20311 for imaging that is mounted on the substrate 20301 that is the upper layer is processed by the signal processing block 20312 for AI processing mounted on the substrate 20302 that is the lower layer, it is possible to perform the series of processing inside the one-chip semiconductor device.

In the optical sensor 20011, the processor such as the CPU 20331 can perform the AI processing. In the case in which the processor of the optical sensor 20011 performs AI processing such as inference processing, the series of processing is performed inside the one-chip semiconductor device, information does not leak to the outside of the sensor, and it is thus possible to enhance confidentiality of the information. Also, since it is not necessary to transmit data such as image data to another device, the processor of the optical sensor 20011 can perform the AI processing such as inference processing using the image data at a high speed. When the inference processing is used for a purpose such as an application requiring a real time property, for example, it is possible to sufficiently secure the real time property. Here, securing the real time property indicates that it is possible to transmit information with a short delay time. Moreover, when the processor of the optical sensor 20011 performs AI processing, it is possible to reduce processing and achieve low power consumption by the processor of the electronic device 20001 passing various kinds of meta data.

Figure 26:
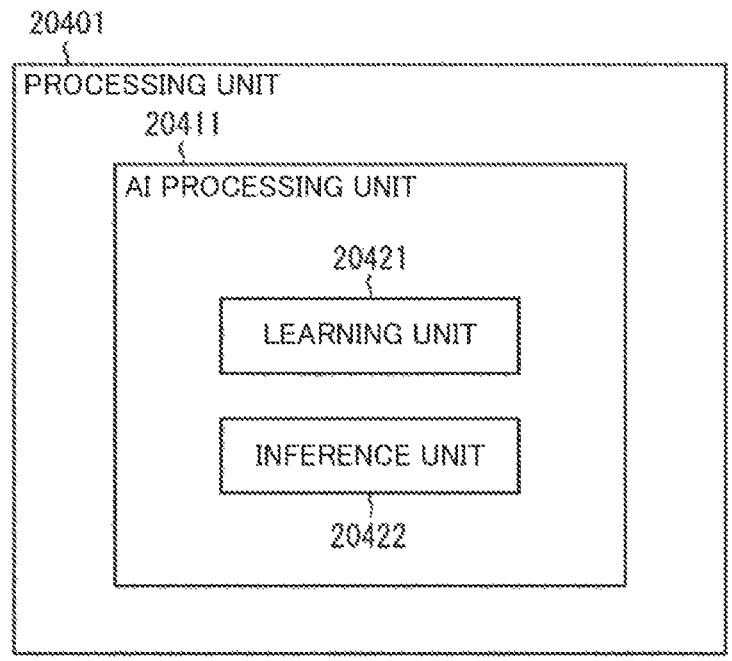
FIG. 26 is a block diagram illustrating a configuration example of a processing unit.

FIG. 26 illustrates a configuration example of a processing unit 20401. The processor of the electronic device 20001, the edge server 20002, the cloud server 20003, or the optical sensor 20011 functions as the processing unit 20401 by executing various kinds of processing in accordance with a program. Note that the plurality of processors that the same device or different devices have may be caused to function as the processing unit 20401.

The processing unit 20401 includes an AI processing unit 20411. The AI processing unit 20411 performs AI processing. The AI processing unit 20411 includes a learning unit 20421 and an inference unit 20422.

The learning unit 20421 performs learning processing of generating a learning model. In the learning processing, a learning model after machine learning on which machine learning for correcting correction target pixels included in image data has been performed is generated. Also, the learning unit 20421 may perform re-learning processing of updating the generated learning model. Although the following description will be given by distinguishing generation of the learning model from updating thereof, the generation of the learning model is assumed to include meaning of updating the learning model since it is also possible to state that the learning model is generated by updating the learning model.

Also, the generated learning model can be newly used in inference processing performed by the inference unit 20422 by being recorded in a recording medium such as a main memory or an auxiliary memory that the electronic device 20001, the edge server 20002, the cloud server 20003, the optical sensor 20011, or the like has. In this manner, it is possible to generate the electronic device 20001, the edge server 20002, the cloud server 20003, the optical sensor 20011, or the like that performs the inference processing based on the learning model. Moreover, the generated learning model may be provided to be used by another device by being recorded in a storage medium or an electronic device that is independent from the electronic device 20001, the edge server 20002, the cloud server 20003, the optical sensor 20011, or the like. Note that the generation of the electronic device 20001, the edge server 20002, the cloud server 20003, the optical sensor 20011, or the like is assumed to include not only newly recording the learning model in the storage medium thereof at the time of manufacturing but also updating the generated learning model that has already been recorded.

The inference unit 20422 performs inference processing using the learning model. In the inference processing, processing for correcting correction target pixels included in image data is performed using the learning model. The correction target pixels are pixels that are correction targets satisfying a predetermined condition from among the plurality of pixels in the image in accordance with the image data. Through the correction processing, it is possible to acquire an image from a camera that is present at a physically overlapping position, to acquire an image from a camera that is present at a position where the camera is not physically present, and acquire an image on the assumption of a sensor that is difficult to be physically disposed as described in the aforementioned embodiments, in a non-limited example, for example.

As a machine learning method, it is possible to use a neural network, deep learning, and the like. The neural network is a model that imitates a human cranial nerve circuit and includes three types of layers, namely an input layer, an intermediate layer (hidden layer), and an output layer. The deep learning is a model using a neural network with a multilayer structure, and it is possible to learn a complicated pattern hiding in a large amount of data by repeating characteristic learning in each layer.

For problem setting of machine learning, it is possible to use supervised learning. For example, a feature amount is learned on the basis of teaching data with a given label in the supervised learning. In this manner, it is possible to derive a label of unknown data. As the teaching data, it is possible to use image data actually acquired by the optical sensor, image data that has already been acquired and collectively managed, for example, a data set or the like generated by the simulator as described on the aforementioned embodiments.

Note that not only supervised learning but also non-supervised learning, semi-supervised learning, enhanced learning, and the like may be used. In the non-supervised learning, a large amount of learning data with no label is analyzed to extract a feature amount, and clustering or the like is performed on the basis of the extracted feature amount. In this manner, it is possible to perform analysis and prediction of a trend on the basis of a huge amount of unknown data. The semi-supervised learning is a combination of the supervised learning and the non-supervised learning and is a method of causing a feature amount to be learned in supervised learning, giving a huge amount of teaching data in non-supervised learning, and repeating leaning while automatically calculating the feature amount. The enhanced learning handles a problem that an agent in a certain environment observes a current state and determines an action to be taken.

In this manner, the AI processing is performed by any of or a plurality of devices from among the processor of the electronic device 20001, the edge server 20002, the cloud server 20003, or the optical sensor 20011 by the devices serving as the AI processing unit 20411.

It is only necessary for the AI processing unit 20411 to include at least one of the learning unit 20421 and the inference unit 20422. In other words, the processor of each device may execute both the learning processing and the inference processing of course or may execute one of the learning processing and the inference processing. For example, both the learning unit 20421 and the inference unit 20422 are included in a case in which the processor of the electronic device 20001 performs both the inference processing and the learning processing, while it is only necessary to include the inference unit 20422 in a case in which only the inference processing is performed.

The processor of each device may execute all kinds of processing regarding the learning processing or the inference processing, or the processor of each device may execute a part of the processing, and the processors of the other devices may then execute the remaining processing. Also, each device may have a common processor for executing each function in the AI processing such as learning processing and the inference processing or may individually have processors for the functions.

Note that the AI processing may be performed by a different device other than the aforementioned devices. For example, it is possible to perform the AI processing by a different electronic device to which the electronic device 20001 can be connected through wireless connection or the like. Specifically, in a case in which the electronic device 20001 is a smartphone, the different electronic device that performs the AI processing can be a device such as another smartphone, a tablet-type terminal, a mobile phone, a personal computer (PC), a game machine, a television receiver, a wearable terminal, a digital still camera, or a digital video camera.

Also, although it is possible to apply the AI processing such as inference processing to a configuration using a sensor mounted on a mobile body such as a vehicle, a sensor used for a remote medical device, or the like, a short delay time is required in such an environment. In such an environment, it is possible to shorten the delay time by the processor of a local-side device (the electronic device 20001 as an in-vehicle device or a medical device, for example) performing the AI processing instead of the processor of the cloud server 20003 performing the AI processing via the network 20040. Moreover, even in a case in which there is no environment where connection to the network 20040 such as the Internet is established or a case of a device used in an environment where high-speed connection cannot be performed, it is possible to perform the AI processing in a more appropriate environment by the processor of the local-side device such as the electronic device 20001 or the optical sensor 20011, for example, performing the AI processing.

Note that the aforementioned configuration is an example, and other configurations may be adopted. For example, the electronic device 20001 is not limited to a mobile terminal such as a smartphone and may be an electronic device such as a PC, a game machine, a television receiver, a wearable terminal, a digital still camera, or a digital video camera, an in-vehicle device, or a medical device. Also, the electronic device 20001 may be connected to the network 20040 through wireless communication or wired communication that is compatible with a predetermined communication scheme such as a wireless local area network (LAN) or a wired LAN. The AI processing is not limited to the processor such as a CPU or a GPU of each device and may use a quantum computer, a neuromorphic computer, or the like.

(Flow of Processing)

Figure 27:
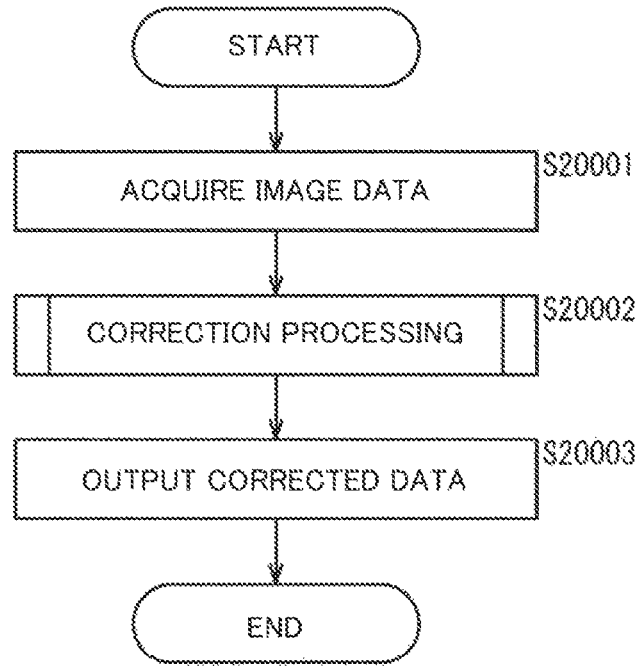
FIG. 27 is a flowchart for explaining a flow of processing using AI.

A flow of processing using AI will be described with reference to the flowchart in FIG. 27.

In Step S20001, the processing unit 20401 acquires image data from the optical sensor 20011. In Step S20002, the processing unit 20401 performs correction processing on the acquired image data. In the correction processing, inference processing using a learning model for at least a part of the image data is performed, and corrected data that is data after correction target pixels included in the image data are corrected is obtained. In Step S20003, the processing unit 20401 outputs the corrected data obtained through the correction processing.

Figure 28:
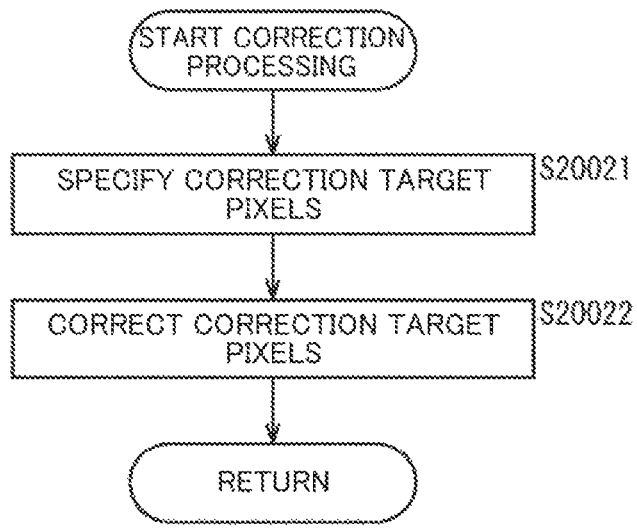
FIG. 28 is a flowchart for explaining a flow of correction processing.

Here, details of the correction processing in Step S20002 described above will be described with reference to the flowchart in FIG. 28.

In Step S20021, the processing unit 20401 specifies the correction target pixels included in the image data. In the step of specifying the correction target pixels (hereinafter, referred to as a detection step), the inference processing or the ordinary processing is performed.

In a case in which the interference processing is performed as the detection step, the inference unit 20422 can detect the correction target pixels since information for detecting the correction target pixels included in the input image data (hereinafter, referred to as detection information) is output by the image data being input to the learning model. Here, a learning model that uses image data including correction target pixels as an input and uses the detection information of the correction target pixels included in the image data as an output is used. On the other hand, in a case in which the ordinary processing is performed as the detection step, the processor or the signal processing circuit of the electronic device 20001 or the optical sensor 20011 performs processing of detecting the correction target pixels included in the image data without using AI. Note that in a case in which it is known that the correction target pixels are all pixels in the image data, the detection step can also be skipped.

If the correction target pixels included in the image data are detected in Step S20021, the processing proceeds to Step S20022. In Step S20022, the processing unit 20401 corrects the detected correction target pixels. In the step of correcting the correction target pixels (hereinafter, referred to as a correction step), inference processing or ordinary processing is performed.

In a case in which the inference processing is performed as the correction step, the inference unit 20422 can correct the correction target pixels since corrected image data or detection information of corrected correction target pixels is output by image data and detection information of correction target pixels being input to the learning model. Here, a learning model that uses the image data including the correction target pixels and the detection information of the correction target pixels as inputs and using the corrected image data or the corrected detection information of the correction target pixels as outputs is used. On the other hand, in a case in which the ordinary processing is performed as a correction step, the processor or the signal processing circuit of the electronic device 20001 or the optical sensor 20011 performs processing of correcting the correction target pixels included in the image data without using AT.

By the inference processing or the ordinary processing being performed in the detection step of detecting the correction target pixels and by the inference processing or the ordinary processing being performed in the correction step of correcting the detected correction target pixels in the correction processing in this manner, the inference processing is performed in at least one step out of the detection step and the correction step. In other words, the inference processing using the learning model is performed on at least a part of the image data from the optical sensor 20011 in the correction processing.

Also, the detection step may be performed integrally with the correction step by using the inference processing in the correction processing. In a case in which the inference processing is performed as such a correction step, the inference unit 20422 can correct the correction target pixels included in the input image data since the image data in which the corrected target pixels have been corrected is output by the image data being input to the learning model. Here, the learning model that uses the image data including the correction target pixels as an input and using the image data in which the correction target pixels have been corrected is used.

Figure 29:
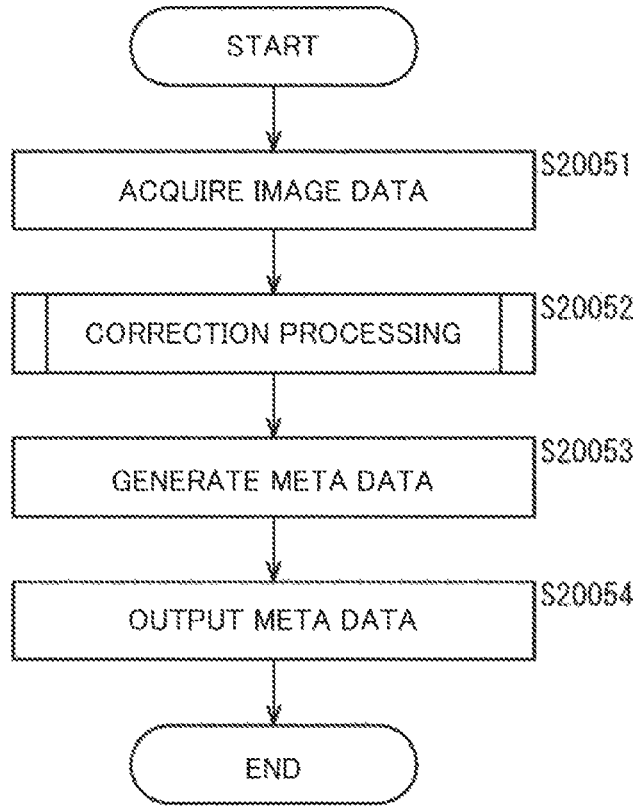
FIG. 29 is a flowchart for explaining a flow of processing using AI.

Incidentally, the processing unit 20401 may generate meta data using corrected data. The flowchart in FIG. 29 illustrates processing in a case in which meta data is generated.

In Steps S20051 and S20052, image data is acquired, and correction processing using the acquired image data is performed, similarly to Steps S20001 and S20002 described above. In Step S20053, the processing unit 20401 generates meta data using the corrected data obtained in the correction processing. In the step of generating the meta data (hereinafter, referred to as a generation step), inference processing or ordinary processing is performed.

In a case in which the inference processing is performed as the generation step, the inference unit 20422 can generate meta data since meta data regarding input correct data is output by the corrected data being input to the learning model. Here, a learning model using the corrected data as an input and using the meta data as an output is used. For example, the meta data includes three-dimensional data such as a point cloud and a data structure. Note that the processing in Steps S20051 to S20054 may be performed through end-to-end machine processing. On the other hand, in a case in which the ordinary processing is performed as the generation step, a processor or a signal processing circuit of the electronic device 20001 or the optical sensor 20011 performs the processing of generating the meta data from the corrected data without using any AI.

As described above, the electronic device 20001, the edge server 20002, the cloud server 20003, or the optical sensor 20011 performs the detection step of detecting correction target pixels and the correction step of correcting the correction target pixels, or the correction step of correcting the correction target pixels included in the image data, as the correction processing using the image data from the optical sensor 20011. Moreover, the electronic device 20001, the edge server 20002, the cloud server 20003, or the optical sensor 20011 can also perform the generation step of generating the meta data using the corrected data obtained in the correction processing.

Furthermore, it is also possible to generate a storage medium that records the data such as corrected data and the meta data and a device such as an electronic device with the storage medium mounted thereon, by recording the data in a readable storage medium. The storage medium may be a storage medium such as a main memory or an auxiliary memory included in the electronic device 20001, the edge server 20002, the cloud server 20003, or the optical sensor 20011 or may be a storage medium or an electronic device that is independent therefrom.

In a case in which the detection step and the correction step are performed in the correction processing, it is possible to perform the inference processing using the learning model in at least one step among the detection step, the correction step, and the generation step. Specifically, the inference processing is performed in at least one step by the inference processing or the ordinary processing being performed in the detection step, the inference processing or the ordinary processing being then performed in the correction step, and the inference processing or the ordinary processing being further performed in the generation step.

Also, in a case in which only the correction step is performed in the correction processing, the inference processing can be performed in the correction step, and the inference processing or the ordinary processing can be performed in the generation step. Specifically, the inference processing is performed in at least one step by the inference processing or the ordinary processing being performed in the generation step after the inference processing is performed in the correction step.

As described above, the inference processing may be performed in all the steps, namely the detection step, the correction step, and the generation step, or the inference processing may be performed in some of the steps, and the ordinary processing may be performed in the remaining steps. Hereinafter, the processing in the case in which the inference processing is performed in each step will be described.

(A) Processing In Case in Which Inference Processing is Performed in Detection Step When inference processing is performed in a detection step in a case in which the detection step and a correction step are performed in the correction processing, the inference unit 20422 uses a learning model using image data including correction target pixels as an input and using detection information of the correction target pixels included in the image data as an output. The learning model is generated through learning processing performed by the learning unit 20421, is provided to the inference unit 20422, and is then used when the inference processing is performed.

Figure 30:
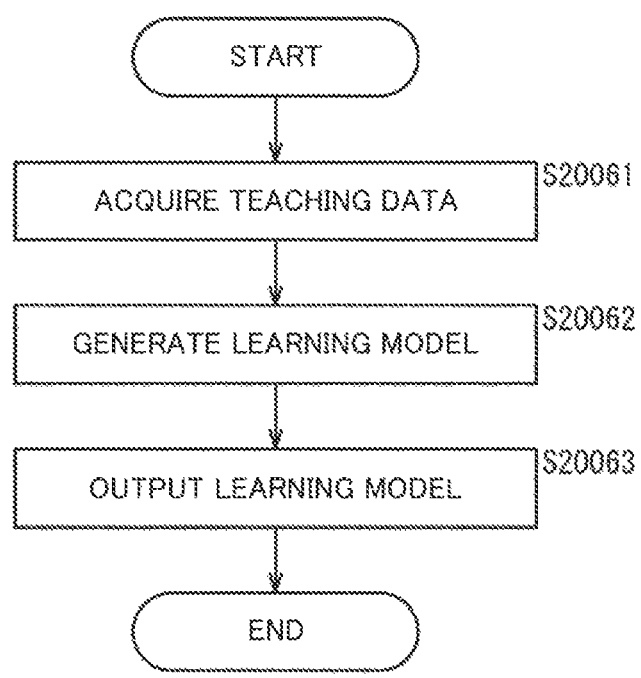
FIG. 30 is a flowchart for explaining a flow of learning processing.

A flow of learning processing performed in advance when the inference processing is performed in the detection step in a case in which the detection step and the correction step are performed in the correction processing will be described as follows with reference to the flowchart in FIG. 30. In other words, the learning unit 20421 acquires, as teaching data, image data actually acquired by the optical sensor, image data that has already been acquired and collectively managed, a data set generated by the simulator, and the like (S20061) and generates a learning model using the acquired teaching data (S20062). As the learning model, a learning model using pixel data including the correction target pixels as an input and using detection information of the correction target pixels included in the image data is generated and is then output to the inference unit 20422 (S20063).

(B) Processing In Case in Which Inference Processing is Performed in Correction Step When inference processing is performed in a correction step in a case in which a detection step and the correction step are performed in the correction processing, the inference unit 20422 uses a learning model using image data including the correction target pixels and the detection information of the correction target pixels as inputs and using corrected pixel data or detection information of correction target pixels that has been corrected as outputs. The learning model is generated through learning processing performed by the learning unit 20421.

A flow of the learning processing performed in advance when the inference processing is performed in the correction step in a case in which the detection step and the correction step are performed in the correction processing will be described as follows with reference to the flowchart in FIG. 30. In other words, the learning unit 20421 acquires, as teaching data, a data set and the like from the simulator as described in the aforementioned embodiments, for example (S20061), and generates a learning model using the acquired teaching data (S20062). As the learning model, a learning model using the image data including the correction target pixels and the detection information of the correction target pixels as inputs and using the corrected image data or the corrected detection information of the correction target pixels as outputs is generated and is then output to the inference unit 20422 (S20063).

Note that the teaching data may use not only the data set provided from the simulator but also image data actually acquired by the optical sensor, image data that has already been acquired and collectively managed, and the like.

(C) Processing In Case in Which Inference Processing is Performed in Correction Step In a case in which only the correction step is performed in the correction processing, the inference unit 20422 uses a learning model using image data including correction target pixels as an input and using image data with the correction target pixels corrected as an output when the inference processing is performed in the correction step. The learning model is generated in the learning processing performed by the learning unit 20421.

A flow of learning processing performed in advance when inference processing is performed in the correction step in a case in which only the correction step is performed in the correction processing will be described as follows with reference to the flowchart in FIG. 30. In other words, the learning unit 20421 acquires, as teaching data, a data set or the like from a simulator as described in the aforementioned embodiments, for example, (S20061) and generates a learning model using the acquired teaching data (S20062). As the learning model, a learning model using image data including correction target pixels as image data as an input and using image data with the correction target pixels corrected as an output is generated and is then output to the inference unit 20422 (S20063).

Note that there is no problem if the teaching data is not limited to the data set provided from the simulator and may further use image data that has actually been acquired by an optical sensor or image data that has already been acquired and collectively managed.

Figure 31:
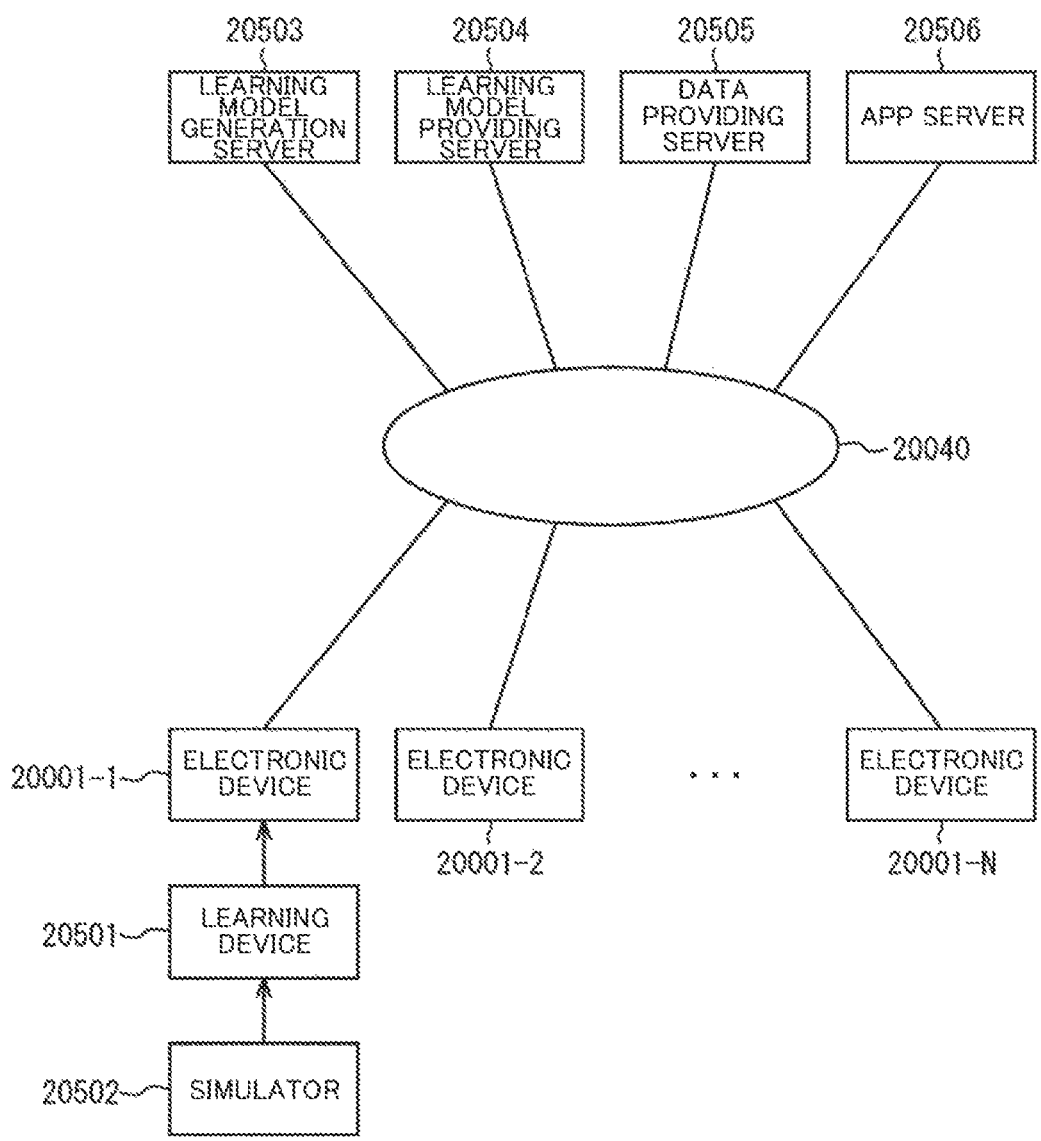
FIG. 31 is a diagram illustrating a flow of data among a plurality of devices.

Incidentally, data such as a learning model, image data, and corrected data may be used in a single device, of course, and may also be exchanged between a plurality of devices and may be used in these devices. FIG. 31 illustrates a flow of data among the plurality of devices.

Electronic devices 20001-1 to 20001-N (N is an integer that is equal to or greater than 1) are owned by individual users, and each of them can be connected to a network 20040 such as the Internet via a base station (not illustrated). In the manufacturing, a learning device 20501 is connected to the electronic device 20001-1, and it is possible to record a learning model provided by the learning device 20501 in an auxiliary memory 20104. The learning device 20501 uses, as teaching data, a data set generated by the simulator 20502 by a method as described in the aforementioned embodiments, for example, to generate a learning model and provides the learning model to the electronic device 20001-1. Note that the teaching data is not limited to data provided from the simulator 20502 and may further includes image data that has actually been acquired by an optical sensor, image data that has already been acquired and collectively managed, and the like.

Although not illustrated in the drawing, the learning model can be recorded in the electronic devices 20001-2 to 20001-N similarly to the electronic device 20001-1 in a stage of manufacturing. Hereinafter, the electronic devices 20001-1 to 20001-N will be referred to as electronic devices 20001 in a case in which it is not necessary to distinguish each of the electronic devices 20001-1 to 20001-N.

In addition to the electronic devices 20001, a learning model generation server 20503, a learning model providing server 20504, a data providing server 20505, and an app server 20506 are connected to the network 20040, such that data can be exchanged with each other. Each server can be provided as a cloud server.

The learning model generation server 20503 has a configuration similar to that of the cloud server 20003 and can perform learning processing using a processor such as a CPU. The learning model generation server 20503 generates a learning model using teaching data. Although the illustrated configuration illustrates, as an example, a case in which the electronic devices 20001 record a learning model at the time of manufacturing, the learning model may be provided from the learning model generation server 20503. The learning model generation server 20503 transmits the generated learning model to the electronic devices 20001 via the network 20040. The electronic devices 20001 receive the learning model transmitted from the learning model generation server 20503 and records the learning model in the auxiliary memory 20104. In this manner, the electronic devices 20001 including the learning model are generated.

In other words, in a case in which the electronic devices 20001 do not record the learning model in the stage of manufacturing, the electronic devices 20001 recording a new learning model is generated by newly recording the learning model from the learning model generation server 20503. Also, in a case in which the electronic devices 20001 have already recorded the learning model in the stage of manufacturing, the electronic devices 20001 recording an updated learning model are generated by updating the recorded learning model to the learning model from the learning model generation server 20503. The electronic devices 20001 can perform inference processing using the appropriately updated learning model.

The learning model is not limited to direct provision from the learning model generation server 20503 to the electronic devices 20001, and the learning model providing server 20504 that collectively manages various learning models may provide the learning model via the network 20040. The learning model providing server 20504 may generate a different device including a learning model by providing the learning model not only to the electronic devices 20001 but also to the different device. Also, the learning model may be recorded and provided in a detachable memory card such as a flash memory. The electronic devices 20001 can read and record the learning model from a memory card attached to a slot. In this manner, it is possible to acquire the learning model even in a case in which the electronic devices 20001 are used in a harsh environment, the electronic device 20001 do not have a communication function, or the amount of information that can be transmitted is small while the electronic devices 2001 have a communication function.

The electronic devices 20001 can provide data such as image data, corrected data, and meta data to other devices via the network 20040. For example, the electronic devices 20001 can transmit data such as image data and corrected data to the learning model generation server 20503 via the network 20040. In this manner, the learning model generation server 20503 can use the data such as image data and corrected data collected from one or more electronic devices 20001 as teaching data to generate a learning model. It is possible to enhance accuracy of learning processing by using more teaching data.

The data such as image data and corrected data is not limited to direct provision from the electronic devices 20001 to the learning model generation server 20503 and may be provided by the data providing server 20505 that collectively manages various kinds of data. The data providing server 20505 may collect data not only from the electronic devices 20001 but also from other devices and may provide the data not only to the learning model generation server 20503 but also to other devices.

The learning model generation server 20503 may perform, on the learning model that has already been generate, re-learning processing of adding data such as the image data and the corrected data provided from the electronic devices 20001 or the data providing server 20505 to teaching data and update the learning model. The updated learning model can be provided to the electronic devices 20001. In a case in which the learning model generation server 20503 performs learning processing or re-learning processing, it is possible to perform the processing regardless of differences in specifications and performances of the electronic devices 20001.

Also, in a case in which a user performs an amendment operation on corrected data or meta data (for example, the user inputs correct information), the electronic devices 20001 may use feedback data regarding the amendment processing for the re-learning processing. For example, the learning model generation server 20503 can perform the re-learning processing using the feedback data from the electronic devices 20001 and update the learning model by transmitting the feedback data from the electronic devices 20001 to the learning model generation server 20503. Note that the electronic device 20001 may use an application provided by the app server 20506 when the user performs an amendment operation.

The re-learning processing may be performed by an electronic devices 20001. In a case in which the electronic devices 20001 performs the re-learning processing using image data or feedback data to update the learning model, it is possible to improve the learning model in the device. In this manner, the electronic devices 20001 including the updated learning model are generated. Also, the electronic devices 20001 may transmit the learning model after updating obtained in the re-learning processing to the learning model providing server 20504 such that the learning model after the updating is provided to the other electronic devices 20001. In this manner, the learning model after updating can be shared among the plurality of electronic devices 20001.

Alternatively, the electronic devices 20001 may transmit difference information of the relearned learning model (a difference information regarding the learning model before updating and the relearning model after updating) as update information to the learning model generation server 20503. The learning model generation server 20503 can generate an improved learning model on the basis of the update information from the electronic devices 20001 and provide the learning model to the other electronic devices 20001. It is possible to protect privacy as compared with a case in which all the pieces of information are exchanged and to reduce manufacturing cost by exchanging such difference information. Note that the optical sensors 20011 mounted on the electronic devices 20001 may perform the re-learning processing similarly to the electronic devices 20001.

The app server 20506 is a server that can provide various applications via the network 20040. The applications provide predetermined functions using data such as a learning model, corrected data, and meta data. The electronic devices 20001 can realize the predetermined functions by executing applications downloaded from the app server 20506 via the network 20040. Alternatively, the app server 20506 can also acquire data from the electronic device 20001 via an application programming interface (API), for example, and execute applications on the app server 20506.

As described above, according to the system including the device to which the present technique is applied, data such as a learning model, image data, and corrected data is exchanged and distributed among the devices, and it is possible to provide various services using the data. For example, it is possible to provide a service of providing a learning model via the learning model providing server 20504 and a service of providing data such as image data and corrected data via the data providing server 20505. Also, it is possible to provide a service of providing applications via the app server 20506.

Alternatively, image data acquired from the optical sensors 20011 of the electronic devices 20001 may be input to the learning model provided by the learning model providing server 20504, and corrected data obtained as an output thereof may be provided. Also, a device such as an electronic device on which the learning model provided by the learning model providing server 20504 is mounted may be generated and provided. Further, data such as learning model, corrected data, and meta data may be recorded in a readable storage medium, and a storage medium recording the data or a device such as an electronic device on which the storage medium is mounted may thus be generated and provided. The storage medium may be a non-volatile memory such as a magnetic disk, an optical disc, a magneto-optical disc, or a semiconductor memory or a volatile memory such as an SRAM or a DRAM.

The aforementioned embodiments may have the following forms.

(1) A method for generating data, which is the training data used for machine learning from a CG model using a processor, the method including: generating, through simulation, a first image acquired under a first imaging condition and a second image acquired under a second imaging condition that is different from the first imaging condition, in the CG model; and acquiring at least the first image and the second image as input image data in the training data.

(2) The method for generating data according to (1), in which an imaging position included in the first imaging condition is a position that is different from an imaging position included in the second imaging condition.

(3) The method for generating data according to (2), further including: generating, through simulation, a third image that is acquired under a third imaging condition including a condition that imaging is performed from the same position as the position of any one of the first imaging condition and the second imaging condition or from a position that is different from both of the positions of the first imaging condition and the second imaging condition, within the CG model; and acquiring at least the third image as output image data in the training data.

(4) The method for generating data according to (3), in which as imaging conditions, the first imaging condition and the second imaging condition further include optical systems with different image angles.

(5) The method for generating data according to (4), in which as imaging conditions, the third images captured at a plurality of changed image angles in the third imaging condition are further acquired.

(6) The method for generating data according to (3), in which as imaging conditions, the first imaging condition and the second imaging condition further include optical systems with different dynamic ranges.

(7) The method for generating data according to (6), in which the first imaging condition is that a pixel value is less likely to be saturated than that of the second imaging condition, and the second imaging condition is that noise is smaller than that of the first imaging condition.

(8) The method for generating data according to (6) or (7), in which the first imaging condition is that a sensor acquires sensing information by performing logarithmic transformation, and the second imaging condition is that a sensor acquires sensing information without performing logarithmic transformation.

(9) The method for generating data according to any one of (6) to (8), in which the first imaging condition and the second imaging condition have different exposure times.

(10) The method for generating data according to any one of (6) to (9), in which the first imaging condition and the second imaging condition have different charge accumulation times in sensors.

(11) The method for generating data according to any one of (6) to (10), in which the third image is an image with a high dynamic range.

(12) The method for generating data according to (3), in which as the imaging conditions, the first imaging condition and the second imaging condition further include conditions that information to be sensed by sensors are different.

(13) The method for generating data according to (12), in which the first imaging condition is imaging of acquiring color information, and the second imaging condition is imaging of acquiring temperature information.

(14) The method for generating data according to (13), in which the second imaging condition is imaging performed by a sensor that senses infrared rays.

(15) The method for generating data according to (13), in which the first imaging condition is imaging of acquiring grayscale information, and the second imaging condition is imaging of acquiring color information.

(16) The method for generating data according to (13), in which the first imaging condition is imaging of acquiring grayscale information, and the second imaging condition is imaging of acquiring information using plasmon resonance.

(17) The method for generating data according to (13), in which a pixel size of the sensor in the first imaging condition and a pixel size of the sensor in the second imaging condition are different sizes.

(18) The method for generating data according to (12), in which the first imaging condition is imaging of acquiring color information, and the second imaging condition is imaging of acquiring distance information.

(19) The method for generating data according to (18), in which the third imaging condition is imaging of acquiring distance information at the same position and in the same direction as those of the first imaging conditions.

(20) The method for generating data according to (18) or (19), in which the second imaging condition and the third imaging condition are imaging of acquiring TOF images.

(21) The method for generating data according to (3), in which the first imaging condition and the second imaging condition are imaging achieved by imaging systems orientated in opposite directions and having optical systems that include super-wide-angle lenses and do not mechanically interfere with each other.

(22) The method for generating data according to (21), further including: generating, through simulation, a fourth image acquired under a fourth imaging condition that is imaging of an optical system orientated in a direction different from that of the third imaging condition and having the same principal point as that of the optical system of the third imaging condition; and acquiring the fourth image as output data of the training data.

(23) The method for generating data according to (2), in which the second imaging condition is imaging in a direction of an optical axis that randomly deviates from a predetermined direction parallel to an optical axis of the first imaging condition from a position that randomly deviates from a relative predetermined position with respect to the first imaging condition.

(24) The method for generating data according to (23), in which the deviation of the position of the second imaging condition from the predetermined position and the deviation of the direction of the optical axis of the second imaging condition from the predetermined direction are acquired as teaching data of the training data.

(25) The method for generating data according to (2), further including: setting a first predetermined position, a second predetermined position, a first optical axis direction, and a second optical axis direction, the first imaging condition being imaging in a direction that randomly deviates from the first optical direction from a position that randomly deviates from the first predetermined position, the second imaging condition being imaging in a direction that randomly deviates from the second optical axis direction from a position that randomly deviates from the second predetermined position.

(26) The method for generating data according to (25), further including: generating, through simulation, a third image acquired under a third imaging condition of imaging the first optical axis direction from the first predetermined position; and generating, through simulation, a fourth image acquired under a fourth imaging condition of imaging the second optical axis direction from the second predetermined position, the third image and the fourth image being acquired as teaching data of the training data.

(27) The method for generating data according to any one of (1) to (23), in which the imaging conditions include a condition of generating a set of input image data in three or more pieces of the training data.

(28) The method for generating data according to any one of (1) to (27), in which the imaging conditions include a condition of generating a set of output image data in two or more pieces of the training data.

(29) A learning method of executing optimization of an estimation model using training data generated by the method for generating data according to any one of (1) to (28).

(30) The learning method according to (29), in which the estimation model is a neural network model.

(31) An estimation method of acquiring estimation data for input data that is actual shooting data using an estimation model optimized using training data generated by the method for generating data according to any one of (1) to (28).

(32) The estimation method according to (31), in which the estimation model is a neural network model.

(33) A data generation device including: a memory; and a processor, in which the processor executes the method for generating data according to any one of (1) to (28).

(34) A learning device including: a memory; and a processor, in which the processor executes the learning method according to (29) or (30).

(35) An estimation device including: a memory; and a processor, in which the processor executes the estimation method according to (31) or (32).

(36) A program that causes a processor to execute the method for generating data according to any one of (1) to (28).

(37) A program that causes a processor to execute the learning method according to (29) or (30).

(38) A program that causes a processor to execute the estimation method according to (31) or (32).

(39) A non-transitory computer-readable medium storing the program according to any one of (36) to (38).

(40) A method for generating a learning model using training data generated from a CG model using a processor and used for machine learning, the method including:
generating, through simulation, a first image acquired under a first imaging condition and a second image acquired under a second imaging condition that is different from the first imaging condition, in the CG model; and
acquiring at least the first image and the second image as input image data in the training data.

(41) The method for generating a learning model according to (40), in which the acquisition of the input image data is executed by the method according to any one of (1) to (27).

(42) A method for generating a storage medium including storing, in a storage medium, a learning model generated by the method for generating a learning model according to (40) or (41).

(43) A method for generating an electronic device including: storing, in a storage medium of an electronic device, a learning model generated by the method for generating a learning model according to (40) or (41).

The aspects of the present disclosure are not limited to the embodiments described above and include various modifications that can be conceived, and effects of the present disclosure are not limited to the aforementioned content. Components in each embodiment may be appropriately applied in combination. In other words, various additions, changes, and partial deletions can be performed without departing from the conceptual idea and spirit of the present disclosure derived from content specified in the claims and equivalents thereof.

REFERENCE SIGNS LIST

1 Data generation system
2 CG generator
3 Simulator
300 Input/output I/F
302 Storage unit
304 Condition setting unit
306 Image generation unit
4 Training device
400 Input/output I/F
402 Storage unit
404 Training unit
406 Model
5 Estimation device
500 Input/output I/F
502 Storage unit
504 Estimation unit
506 Learned model

The invention claimed is:

1. A method comprising:
generating, with an electronic processor and through simulation in a computer-generated (CG) model, a first image acquired under a first imaging condition and a second image acquired under a second imaging condition that is different from the first imaging condition, wherein a first imaging position included in the first imaging condition is different from a second imaging position included in the second imaging condition;
setting, with the electronic processor, the first image and the second image as input image data in training data;
generating, with the electronic processor and through simulation in the CG model, one or more third images based on a third imaging condition including a condition that imaging is performed from a third imaging position that is the same as any one of the first imaging position and the second imaging position or from a fourth imaging position that is different from both of the first imaging position and the second imaging position;
setting the one or more third images as output image data in the training data; and
performing, with the electronic processor, training of a machine learning model with the training data, and
wherein the first imaging condition and the second imaging condition are imaging achieved by imaging systems orientated in opposite directions and having optical systems that include super-wide-angle lenses and do not mechanically interfere with each other.

2. The method according to claim 1, wherein as imaging conditions, the first imaging condition and the second imaging condition further include optical systems with different image angles.

3. The method according to claim 2, wherein as imaging conditions, the one or more third images are generated based on a plurality of changed image angles in the third imaging condition.

4. The method according to claim 1, wherein as imaging conditions, the first imaging condition and the second imaging condition further include optical systems with different dynamic ranges.

5. A method comprising:
generating, with an electronic processor and through simulation in a computer-generated (CG) model, a first image acquired under a first imaging condition and a second image acquired under a second imaging condition that is different from the first imaging condition, wherein a first imaging position included in the first imaging condition is different from a second imaging position included in the second imaging condition;
setting, with the electronic processor, the first image and the second image as input image data in training data;
generating, with the electronic processor and through simulation in the CG model, one or more third images based on a third imaging condition including a condition that imaging is performed from a third imaging position that is the same as any one of the first imaging position and the second imaging position or from a fourth imaging position that is different from both of the first imaging position and the second imaging position;
setting the one or more third images as output image data in the training data; and performing, with the electronic processor, training of a machine learning model with the training data,
wherein as imaging conditions, the first imaging condition and the second imaging condition further include conditions that information to be sensed by sensors are different, and
wherein the first imaging condition is imaging of acquiring grayscale information, and
the second imaging condition is imaging of acquiring information using plasmon resonance.

6. The method according to claim 1,
wherein as imaging conditions, the first imaging condition and the second imaging condition further include conditions that information to be sensed by sensors are different, wherein the first imaging condition is imaging of acquiring color information, and the second imaging condition is imaging of acquiring temperature information.

7. The method according to claim 1, wherein a pixel size of a first sensor in the first imaging condition and a pixel size of a second sensor in the second imaging condition are different sizes.

8. The method according to claim 1, wherein as imaging conditions, the first imaging condition and the second imaging condition further include conditions that information to be sensed by sensors are different, wherein the first imaging condition is imaging of acquiring color information, and the second imaging condition is imaging of acquiring distance information.

9. The method according to claim 8, wherein the third imaging condition is imaging of acquiring distance information at the first imaging position and in the same direction as an optical system of the first imaging condition.

10. The method according to claim 5, wherein the first imaging condition and the second imaging condition are imaging achieved by imaging systems orientated in opposite directions and having optical systems that include super-wide-angle lenses and do not mechanically interfere with each other.

11. The method according to claim 1, further comprising:

generating, with the electronic processor and through simulation in the CG model, a fourth image acquired under a fourth imaging condition that is imaging of an optical system orientated in a direction different from that of the third imaging condition and having a same principal point as that of the optical system of the third imaging condition; and setting, with the electronic processor, the fourth image as output data of the training data.

12. The method according to claim 1, wherein the second imaging condition is imaging in a direction of an optical axis that randomly deviates from a predetermined direction parallel to an optical axis of the first imaging condition from a position that randomly deviates from a relative predetermined position with respect to the first imaging condition.

13. The method according to claim 12, wherein a first deviation of the position of the second imaging condition from the relative predetermined position and a second deviation of the direction of the optical axis of the second imaging condition from the predetermined direction are acquired as teaching data of the training data.

14. The method according to claim 1, wherein as imaging conditions, the first imaging condition and the second imaging condition include a condition of generating a set of input image data in three or more pieces of the training data.

15. The method according to claim 1, wherein as imaging conditions, the first imaging condition and the second imaging condition include a condition of generating a set of output image data in two or more pieces of the training data.

16. A learning method comprising:

performing, with the electronic processor, optimization of an estimation model using the training data generated by the method according to claim 1.

17. An estimation method comprising:

generating, with the electronic processor, estimation data for input data that is actual shooting data using the estimation model according to claim 16.

18. A method comprising:

generating, with an electronic processor and through simulation in a computer-generated (CG) model, a first image acquired under a first imaging condition and a second image acquired under a second imaging condition that is different from the first imaging condition, wherein a first imaging position included in the first imaging condition is different from a second imaging position included in the second imaging condition;

setting, with the electronic processor, the first image and the second image as input image data in training data;

generating, with the electronic processor and through simulation in the CG model, one or more third images based on a third imaging condition including a condition that imaging is performed from a third imaging position that is the same as any one of the first imaging position and the second imaging position or from a fourth imaging position that is different from both of the first imaging position and the second imaging position;

setting the one or more third images as output image data in the training data; and generating, with the electronic processor, a learning model using the training data, wherein the first imaging condition and the second imaging condition are imaging achieved by imaging systems orientated in opposite directions and having optical systems that include super-wide-angle lenses and do not mechanically interfere with each other.

19. The method of claim 18, further comprising:

storing, with the electronic processor, the learning model in a storage medium.

20. The method of claim 19, wherein the storage medium is included in an electronic device.

* * * * *